United States Patent [19]

Morgan

[11] Patent Number: 4,608,575

[45] Date of Patent: Aug. 26, 1986

[54] COMPUTER CONTROLLED MULTI-TASKING INK JET PRINTING SYSTEM

[75] Inventor: Eugene L. Morgan, Belleville, Ill.

[73] Assignee: Printos Marsh Corporation, Belleville, Ill.

[21] Appl. No.: 665,363

[22] Filed: Oct. 26, 1984

Related U.S. Application Data

[63] Continuation-in-part of Ser. No. 648,647, Sep. 7, 1984, abandoned.

[51] Int. Cl.⁴ .............................................. G01D 15/18
[52] U.S. Cl. ................................. 346/33 R; 101/35; 346/75; 346/140 R; 364/132; 364/518; 400/126
[58] Field of Search ............... 346/75, 140, 33 R, 44; 364/518, 132, 131, 130; 400/126; 101/35

[56] References Cited

U.S. PATENT DOCUMENTS

| | | | |
|---|---|---|---|
| 4,262,336 | 4/1981 | Pritchard | 364/132 X |
| 4,378,564 | 3/1983 | Gross | 346/75 |
| 4,393,386 | 7/1983 | Digiulio | 346/75 |

FOREIGN PATENT DOCUMENTS 88630  9/1983  European Pat. Off.

Primary Examiner—Joseph W. Hartary
Attorney, Agent, or Firm—Rogers, Howell, Moore & Haferkamp

[57] ABSTRACT

A computer controlled ink jet printing system for printing messages in dot matrix format on objects such as cartons or the like as they move along conveyor lines past printing stations, and which includes one or more print head controls. The system further includes a plurality of print heads, at least one per print station, for discharging ink onto the objects as they move therepast in accordance with a programmed message. Each print head control is capable of controlling print heads at a plurality of stations with the print heads at one station controlled independently of those of another station to print programmed messages at their respective stations. A main controller is linked to each print head control and includes a programmable microprocessor whereby messages may be selected at the main controller for printing by each print head. The selected messages are communicated by the main controller to the print head controls, whereby each print head control independently controls the print heads associated therewith at each of a plurality of print stations to print onto the objects the messages selected at the main controller.

36 Claims, 29 Drawing Figures

COMPUTER CONTROLLED MULTI-TASKING INK JET PRINTING SYSTEM

BACKGROUND AND SUMMARY OF THE INVENTION

This application is a continuation-in-part of Ser. No. 648,647 filed Sept. 7, 1984 now abandoned.

This invention relates to ink jet printing systems, and more particularly such systems of the type generally referred to as "drop on command" systems. They are distinguished from other types of ink jet apparatus in that they print in a dot matrix format.

Such systems have recently gained wide use for automatically printing preselected messages on objects such as cartons or the like as they move along a conveyor past a printing station. Typically, they include one or more print heads located at a printing station. Each print head includes a series of nozzles, usually vertically aligned although not necessarily so, the number of such nozzles depending on the size of the dot matrix format for printing each character. For example, a typical 5×7 dot matrix would utilize seven nozzles. Ink is supplied to each nozzle from a suitable ink source through solenoid operated control valves. These valves have very fast response and are actuated by signals from a controller. When a particular valve is open, ink is supplied to the nozzle associated with that valve and discharged onto the object in the form of a dot as the object passes by the print head. As is well known, by properly controlling the valves, any decimal number, the letters of the alphabet, and other symbols may be printed as represented by dots.

Also with known systems, a controller of some kind is provided with a microprocessor with means for programming selected messages to be printed by each print head. There are various types of known systems.

One such system illustrated in FIG. 4A utilizes a microprocessor controller at each print station or assembly line and which has the capability of controlling a plurality of print heads located at a single print station. The controller is programmable to select messages to be printed by each print head. A photocell or other sensing device senses the presence of an object as it moves past the print station, and each of the print heads at that station initiates printing after each object is sensed. Each controller controls the print heads at one print station so that a controller is needed at each separate station or conveyor line, and each controller must be programmed at the controller location.

Another known system illustrated in FIG. 4B is essentially an outgrowth of the one just described and which utilizes a personal computer linked to one or more controllers for programming each controller with messages to be printed by the print heads associated therewith. In addition to selecting the messages to be printed, it is also possible to select at the PC other variables of each print head such as dot size, character width, forward or reverse printing, upright or inverted printed, or the like. While this system makes it possible to store messages, and program the various controllers from a central location rather than at the location of each controller, it is still necessary to have a controller for the print heads at each station or conveyor line.

Another known system illustrated in FIG. 4C utilizes a main controller linked to one or more first print head controllers, which in turn control one or more second print head controllers each of which has a print head associated therewith. With this known system, there is one controller device for each print head, and still another controller device for each print station or conveyor line.

The present invention illustrated in FIG. 4D represents an improvement over these known systems in providing a system where one or more print head controllers each has the capability of controlling multiple print heads with the print heads at different print stations, either at the same conveyor line or different conveyor lines. Each such print head controller independently controls each print head and includes input means from each station, which may be a photocell, tachometer or the like, in response to which the print heads at each station are initiated. In addition to each print head controller having the capability of controlling multiple print heads at a plurality of stations, the system of the present invention also includes a main controller linked to the one or more print head controllers. Messages for printing by the various print heads may be selected at the main controller and communicated to the print head controllers. Each of the print head controllers has a microprocessor programmed by the main controller and which controls the print heads associated therewith independently of the main controller, once the print head controller has received instructions from the main controller. In other words, once the programmed messages are communicated by the main controller to the print head controller, the print head controller carries out the printing operation independently of the main controller and even if it is disconnected from the print head controller. The main controller also includes a microprocessor which may be programmed to select the messages to be printed and which includes memory for storing preselected messages. In addition to message selection, the system also has the capability of selecting at the main controller certain parameters such as dot size, character width, spacing from the leading edge of the object to begin printing (product delay), forward or reverse printing, upright or inverted printing, and single or double dot printing for each print head.

Hence, the system of the present invention offers significant advantages in versatility and economy. It provides for the use of multiple print heads at multiple stations and even multiple conveyors without requiring a print head controller for each print head or even for each station. It provides the versatility of either a single or multiple print head controllers, each controlling a multiple of print heads which may be at different stations, and where the messages printed by each print head are selected at a main controller. The system may be expanded with ease and without necessarily the expense of an additional print head controller for each added station.

These and other advantages of the invention are apparent from the drawing and detailed description to follow.

DETAILED DESCRIPTION OF PREFERRED EMBODIMENT

Figure 1:
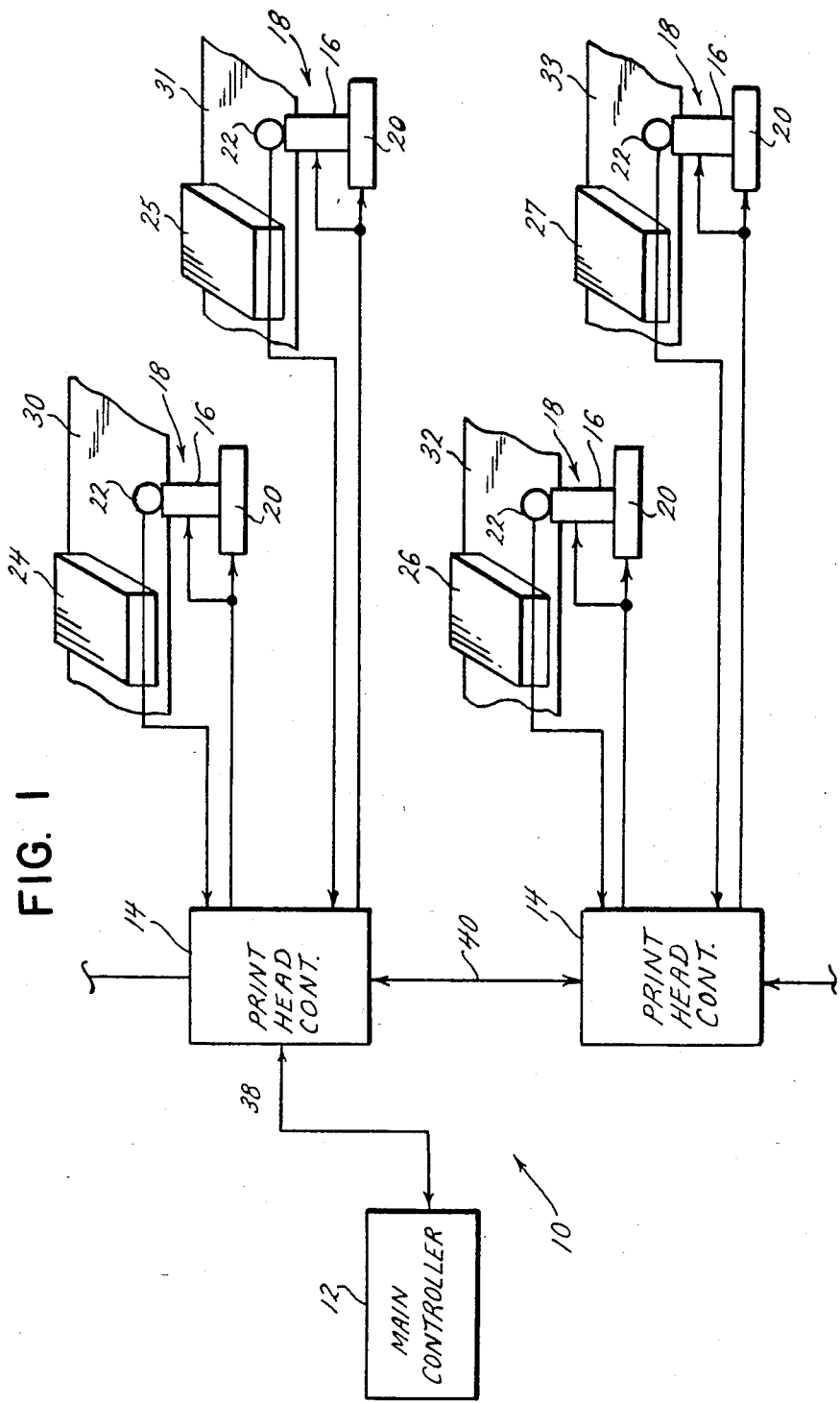
FIG. 1 is a schematic diagram of a computer controlled ink jet printing system of the present invention showing each print head controller controlling print heads at different print stations.
Figure 4:
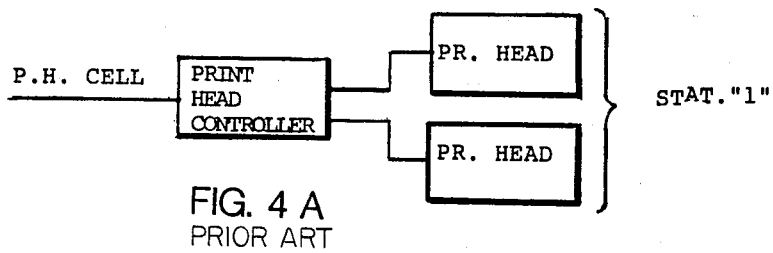
FIGS. 4A, 4B, 4C and 4D are schematic diagrams illustrating known ink jet systems, with FIG. 4D illustrating the system of the present invention.
Figure 4:
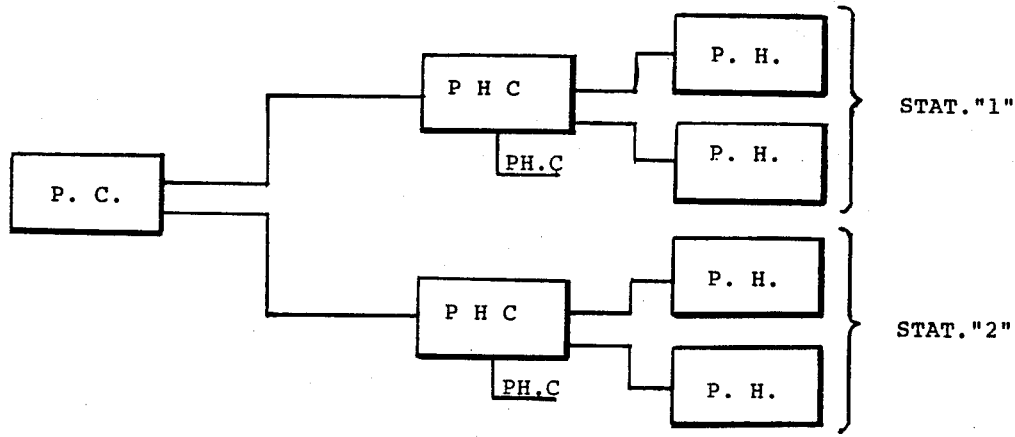
Figure 4:
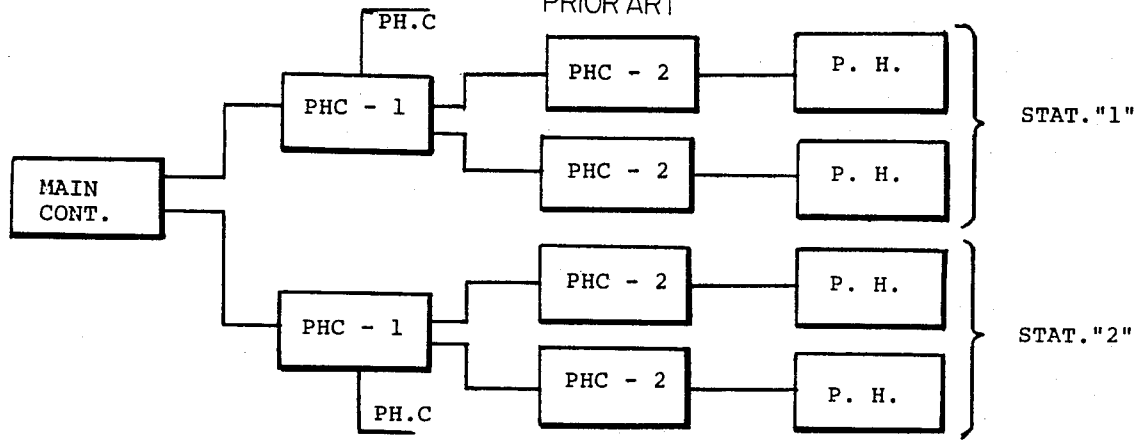
Figure 4:
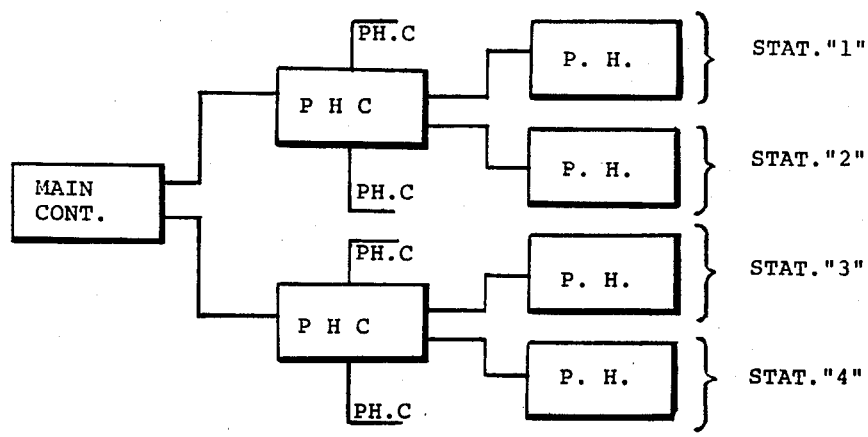

The system 10 of the present invention is shown generally in FIGS. 1 and 4D. The system includes a microprocessor based main controller 12 in communication with one or more microprocessor based print head controllers 14. Each print head controller 14 has the capability of controlling a plurality of print heads 16 which are located at print stations 18. Also at each print station is an ink supply 20 for supplying ink to the print head as is well known in the art. Also at each print station is a sensing device 22, such as a photocell or other suitable device, for sensing the presence of an object 24, 25, 26, 27 to be printed as it moves past the print head on a conveyor 30, 31, 32, 33. The print heads, ink supplies, and photocell sensors may be those shown and described in Cross et al. U.S. Pat. No. 4,378,564, the entirety of which is incorporated herein by reference. Hence, the system 10 functions to print selected messages in dot matrix format on the various objects such as the cartons 24–27 as they move past the print heads. Thus, each print head 16 has nozzles (not shown) for discharging ink onto the object, and solenoid valves (not shown) which are operated in response to electrical signals for controlling the supply of ink to the nozzles and thereby print characters in dot matrix format on the object as it moves past and in accordance with a programmed message. The nozzles, valves and other details of the print heads and ink supply are described in U.S. Pat. No. 4,378,564. Other suitable print heads and ink supply apparatus for printing in dot matrix format may also be used. Such print heads and ink supplies are well known in the art.

In accordance with the system 10 of this invention, each print head controller 14 may control a plurality of print heads with each such print head being controlled completely independently of the other. This makes it possible for each print head controller 14 to control multiple print heads where those print heads are located at multiple print stations. As will be noted from FIG. 1, the multiple print stations 18 may be associated with the same conveyor lines or different lines. While only one print head is shown per station, it is to be understood that there could also be multiple print heads at each station for printing a plurality of lines of message at each station. Further, while two print stations are shown for each print head controller, the software and printed circuit board of the print head controller 14, with suitable modifications using the teaching of the present invention, could independently control print heads at more stations.

Figure 2A:
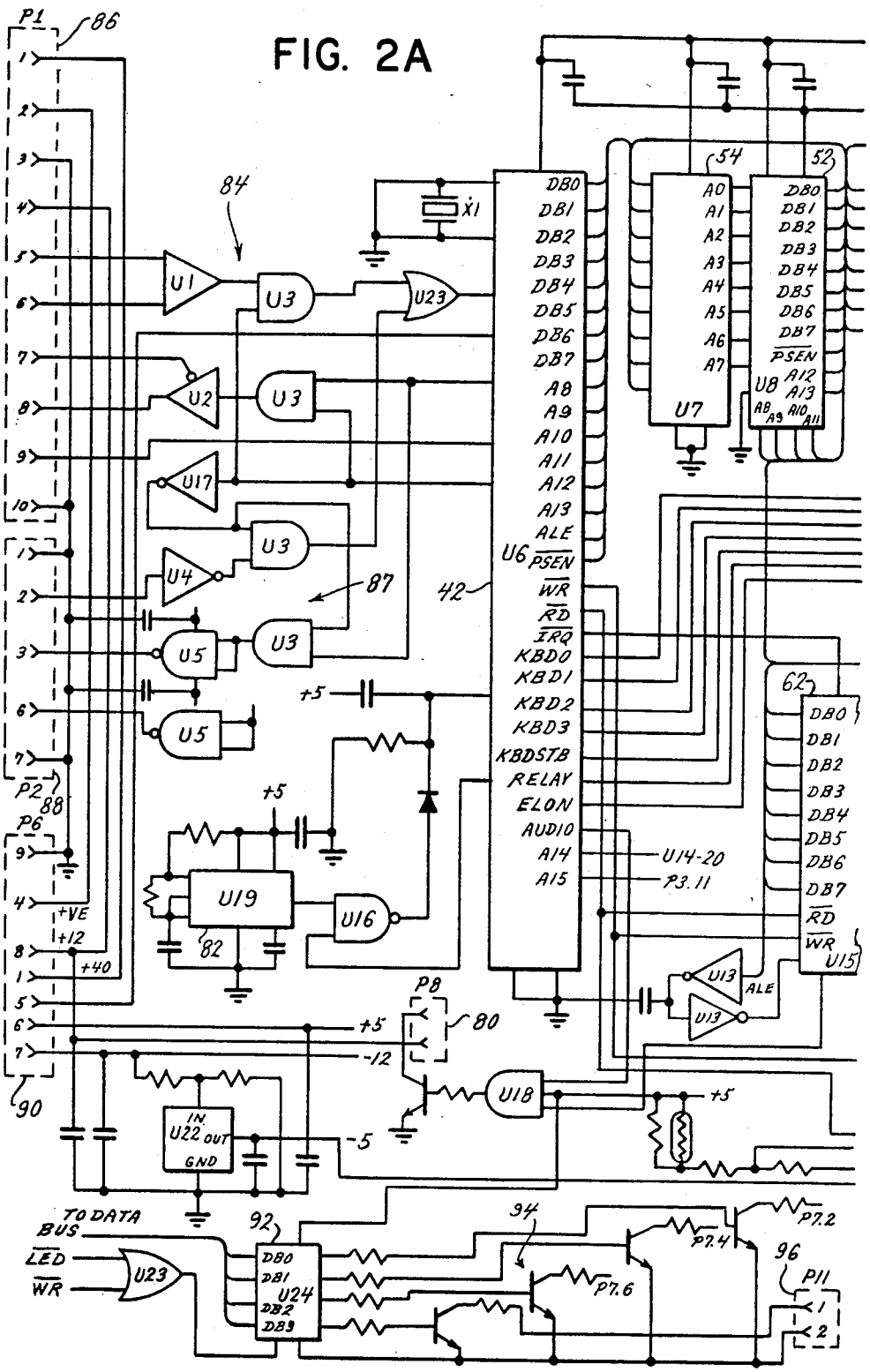
FIGS. 2A, 2B, and 2C are electrical schematics of the printed circuit board for the main controller used with the system of the present invention.
Figure 2B:
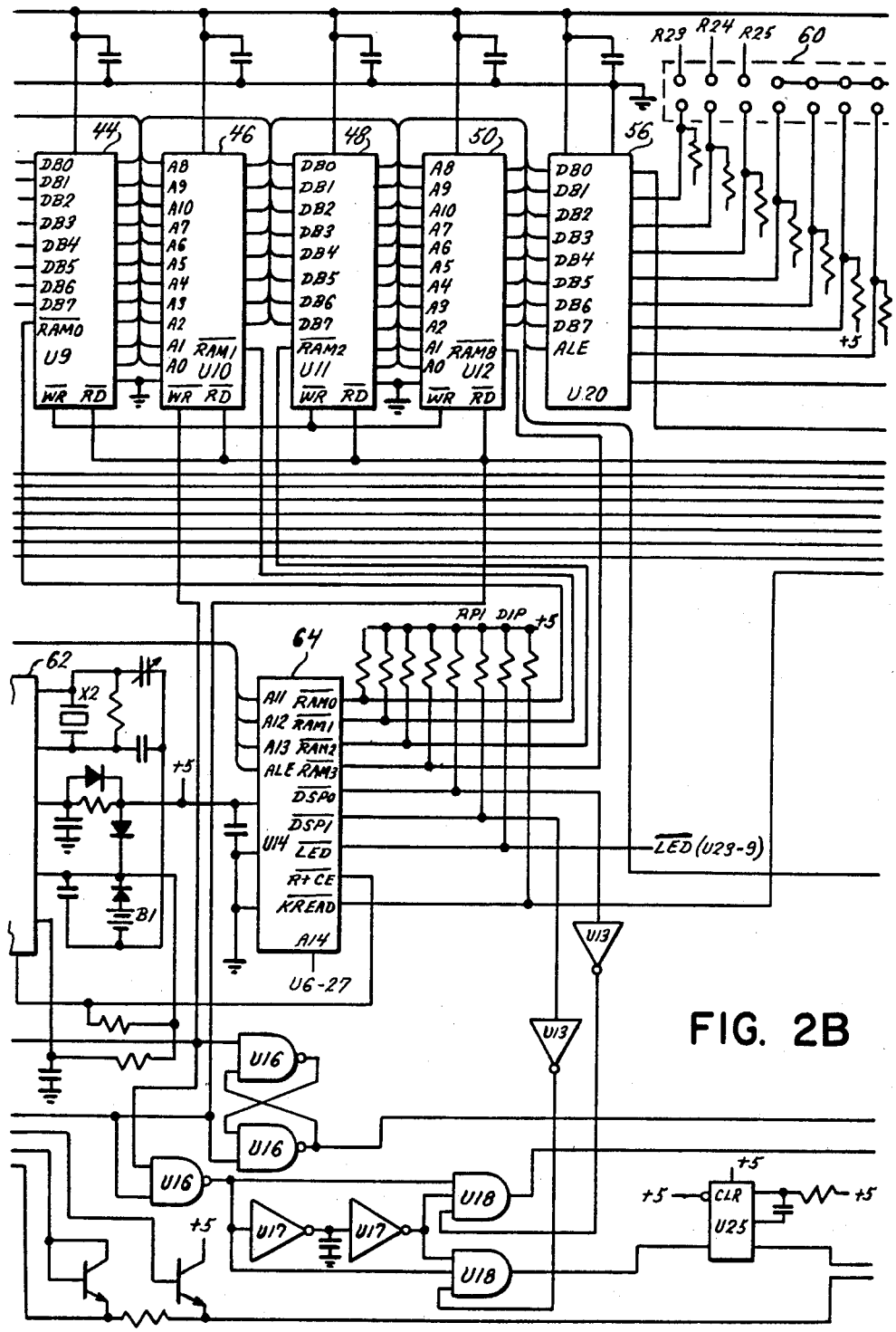
Figure 2C:
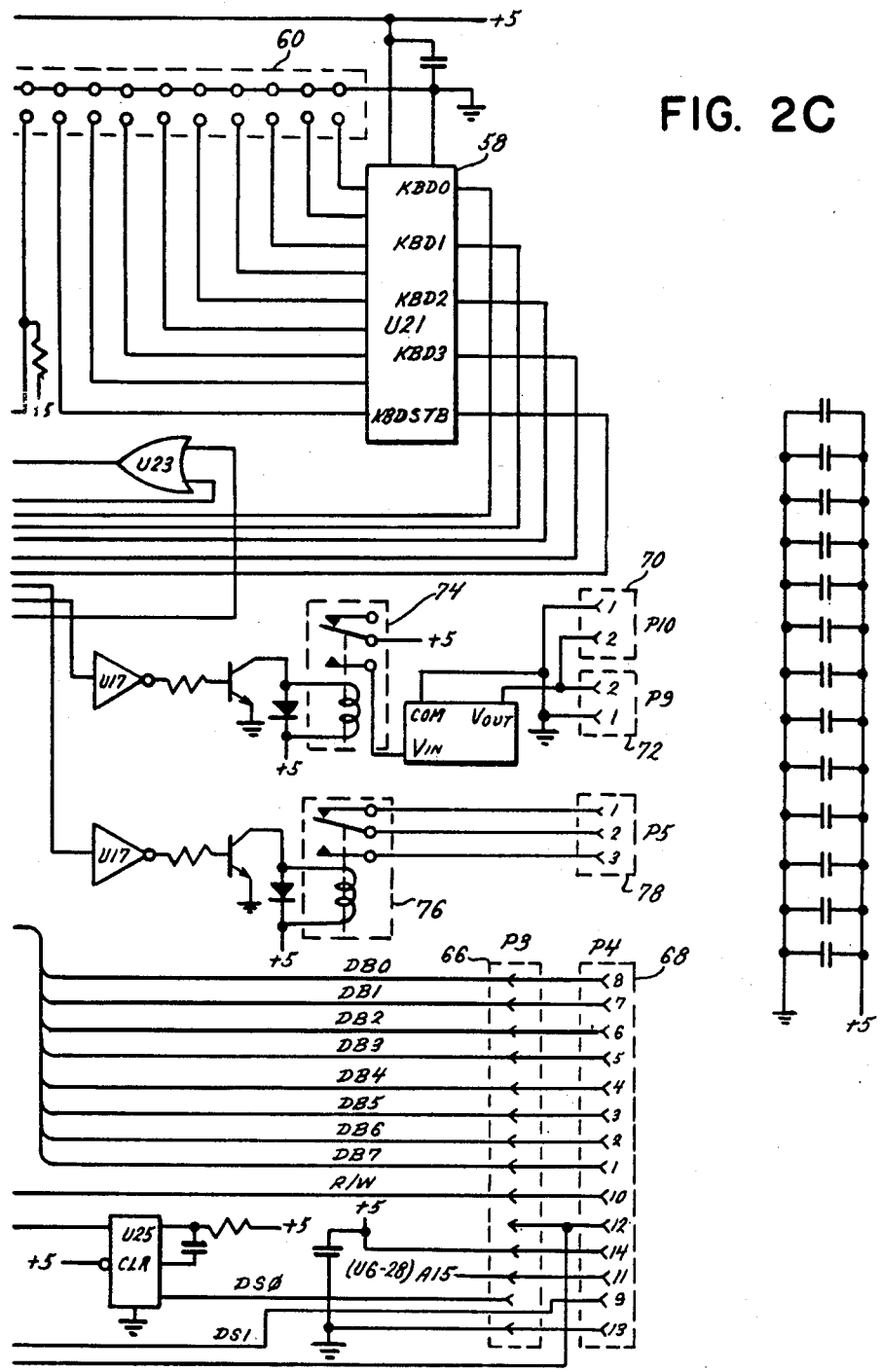
Figure 3A:
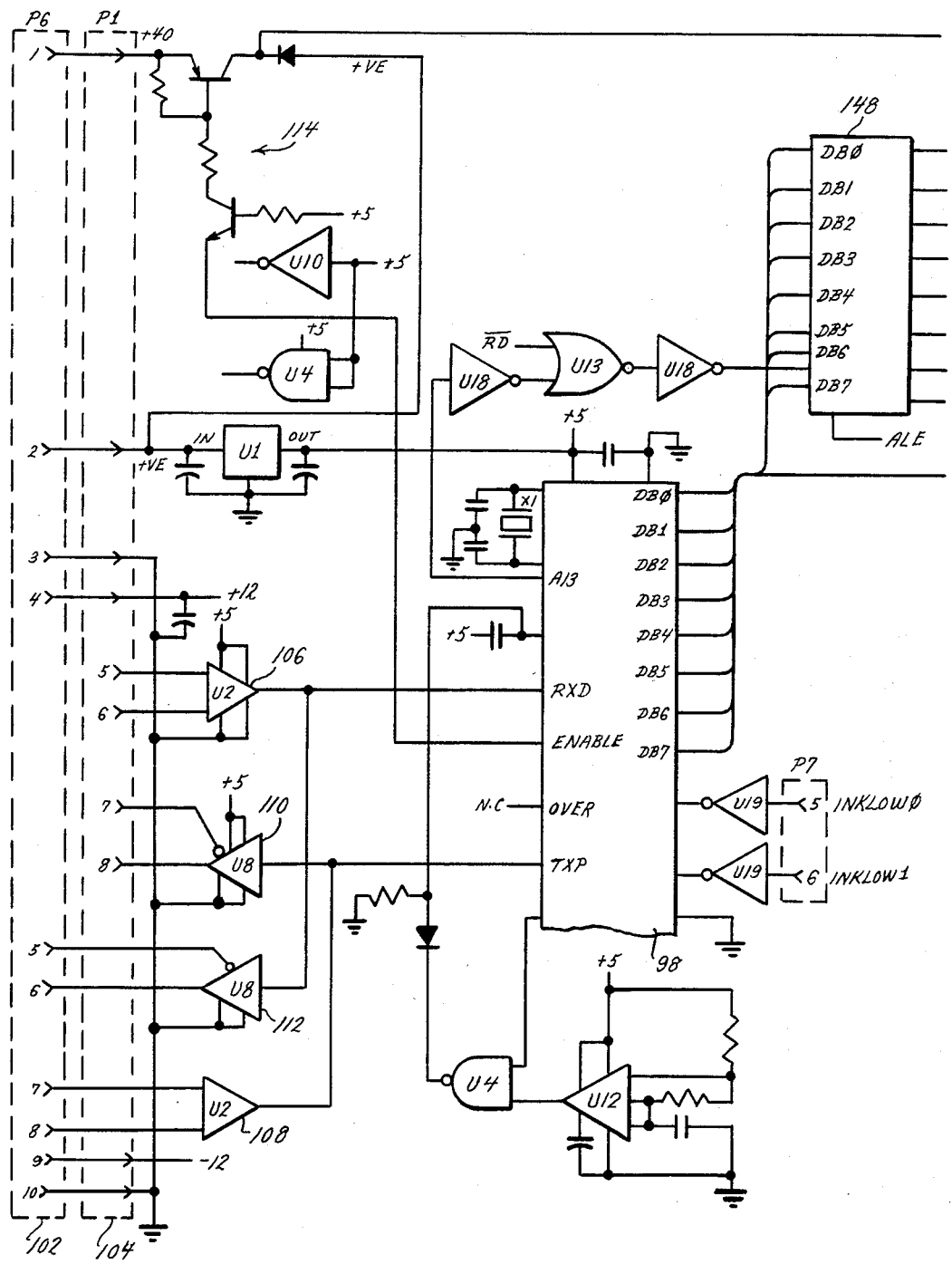
FIGS. 3A, 3B, 3C and 3D are electrical schematics of the printed circuit board for each print head controller of the present invention.
Figure 3B:
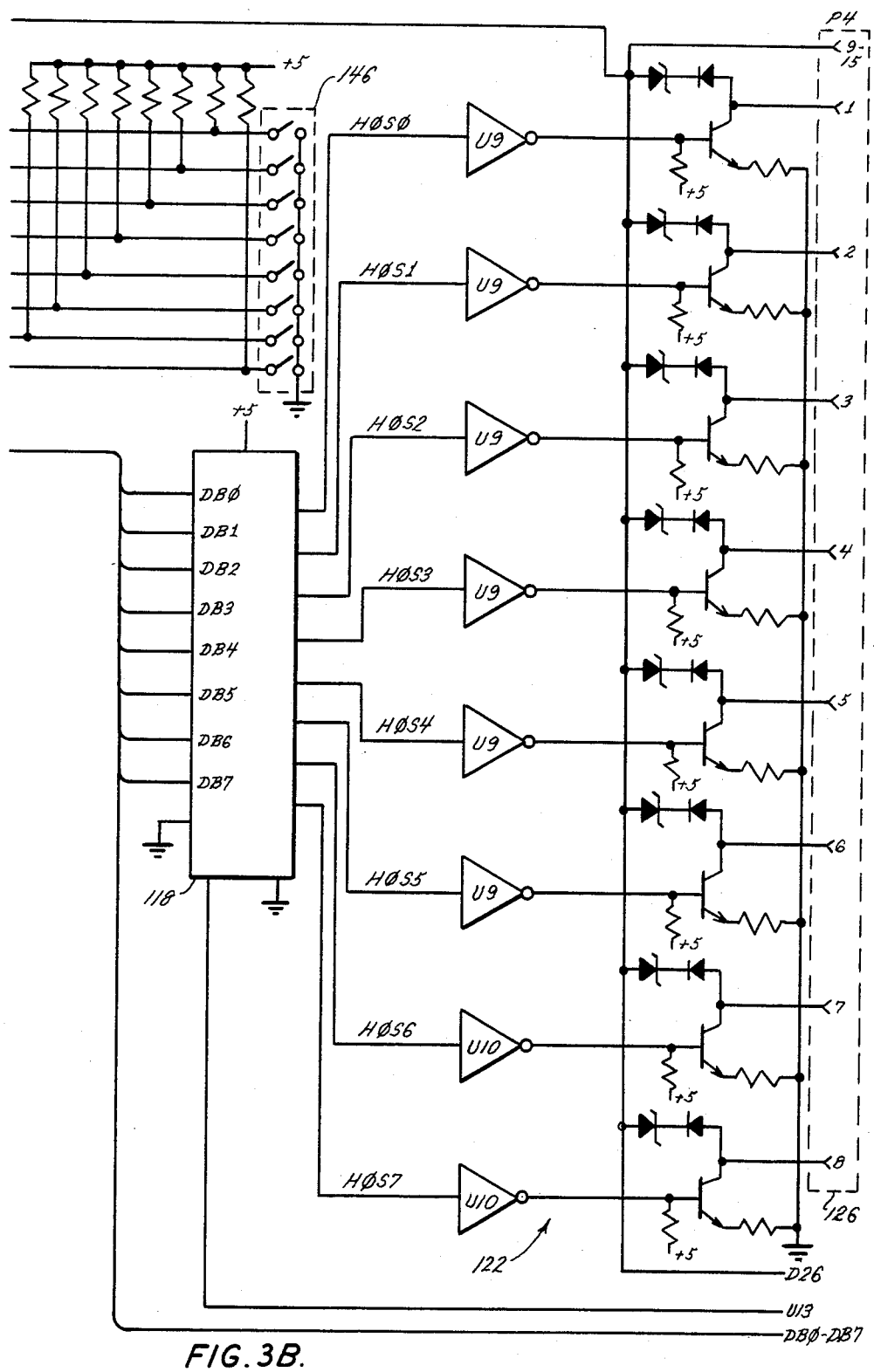
Figure 3C:
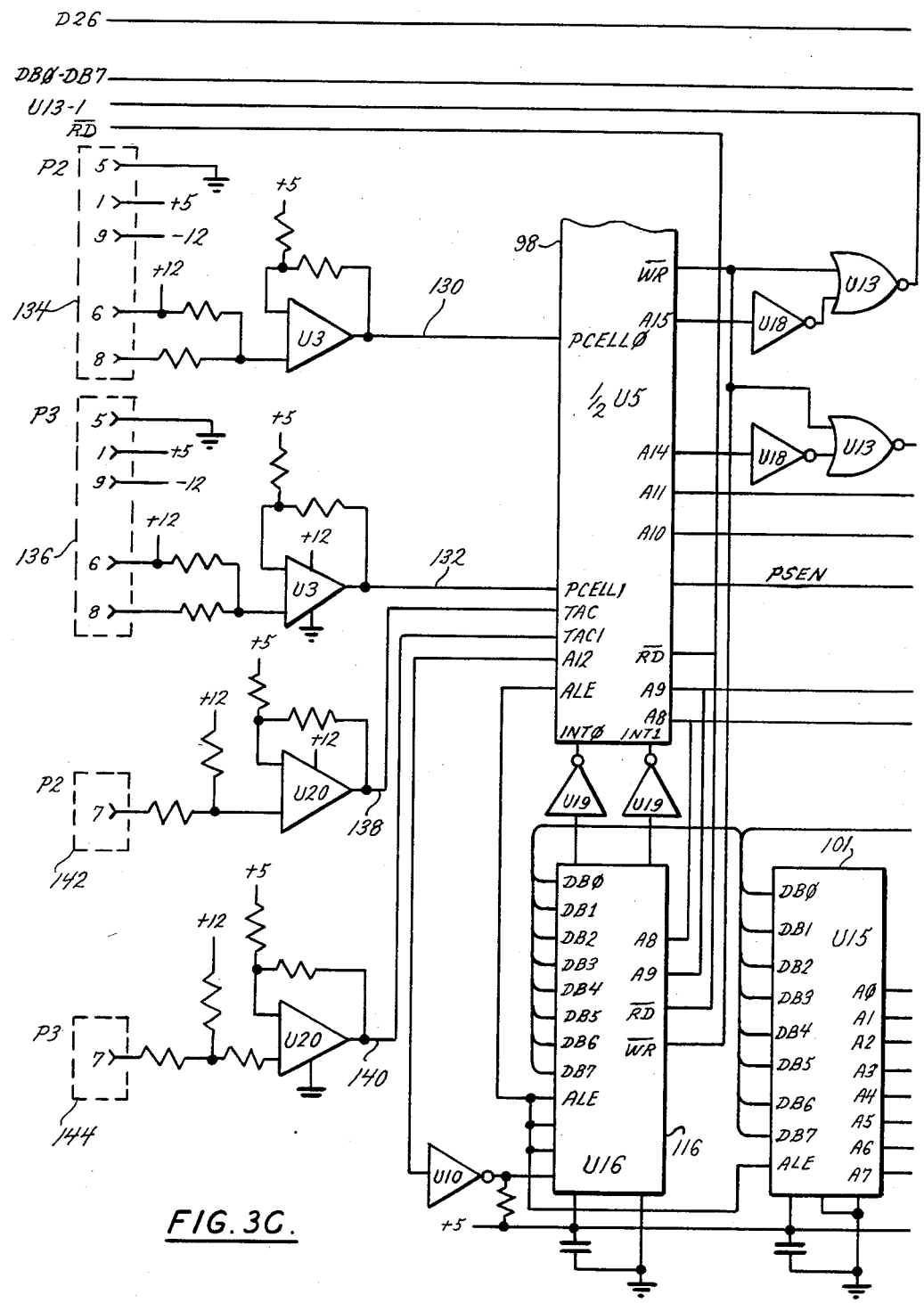
Figure 3D:
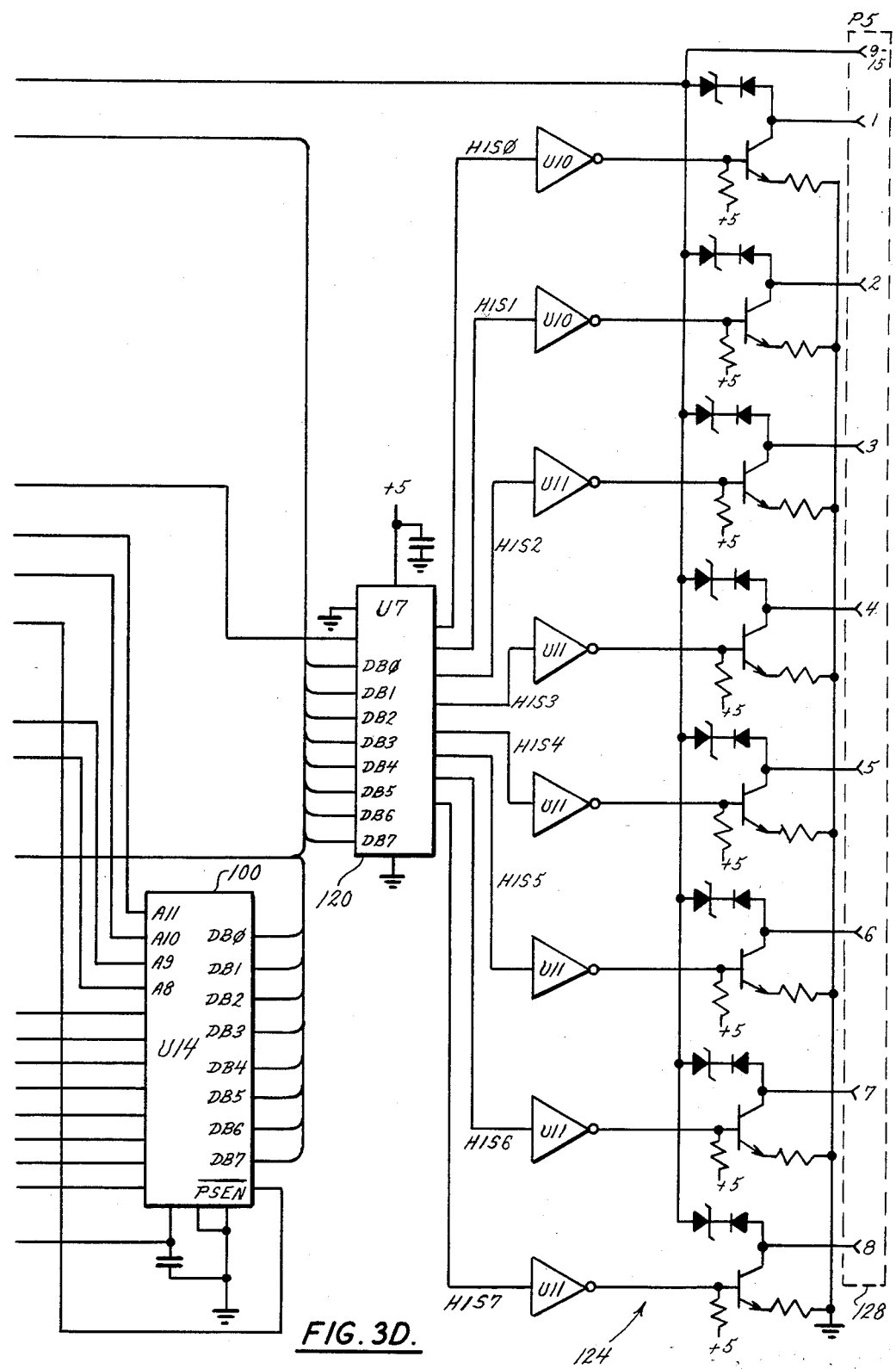

The main controller printed circuit board is shown in FIG. 2 and includes at its heart a microprocessor 42 interconnected to four RAM chips 44, 46, 48, 50; a ROM chip 52 which has resident the program for running microprocessor 42; and other miscellaneous chips and components as will now be described. Address latch 54 is connected between the ROM chip 52 and decodes the program therein for the microprocessor 42. A keyboard latch 56, and keyboard output decoder 58 interface between the microprocessor 42 and an output connector 60 for connection to a keyboard terminal as previously described above. A real time clock and RAM 62 provide the real time for display and for program operation. Address decoder 64 provides the address decode function for the entire system. Connectors 66, 68 provide output connections to the displays on the terminal counsel, and connectors 70, 72 provide connection for the backlighting on the displays, the outputs of which are controlled by a relay 74, as shown. Alarm outputs are provided by relay 76 as terminated in connector 78; and a speaker connection is provided by connector 80 for enunciating alarms, or keyboard clicks, as desired. A timer chip 82 provides the main timing for the microprocessor in execution of the program, as known in the art. A number of driver logic gates 84 are interconnected between the microprocessor 42 and connector 86 and provide the terminal connection for the address and data transmitted to each of the print head controls. A second set of logic gates 87 provide a similar function for connector 88 for interconnection with a printer, input terminal, or other similar device. Connector 90 provides a termination point for input power to the main controller as shown in FIG. 2. A latch 92 drives a series of transistors 94 to operate the LEDs of the display through connector 60. An additional switched contact is provided through connector 96.

FIG. 3 shows the schematic connection for the print head control PC board and includes a main microprocessor 98 interconnected with a RAM 100 which has an associated address latch 101 and wherein is stored the program for operating the print head control. Terminal connectors 102, 104 provide the connection point for the "daisy chain" between print head controls and the main controller. Logic gates 106 and 108 step up the input data for microprocessor 98 and logic gates 110, 112 feed the data back out through terminals 102, 104, as shown. A group of transistors and resistors 114 provide the power input for the print heads, and they extend to the power drivers for the print heads, described below. Timer chip 116 provides two timing outputs into microprocessor 98 such that two separate timing signals can be utilized to drive two separate sets of print heads. A pair of print head data latches 118, 120 are each associated with a plurality of driver outputs generally referred to as 122, 124 which are in turn connected to terminal connectors 126, 128 for connection to print heads (not shown in FIG. 3). As shown in FIG. 3, eight separate outputs are controlled by each print head address latch 118, 120 to individually drive up to eight spray jets associated with a single print head, as known in the art. Also shown in connection with the print head control is a pair of photocell inputs 130, 132 interconnecting terminal connectors 134, 136 to microprocessor 98, the terminal connectors 134, 136 providing termination points for connection to photocells as may individually be used with two separate conveyor lines. Additionally, two tachometer inputs 138, 140 interconnect between terminal connectors 142, 144 to provide two separate tachometer generator inputs to microprocessor 98, each one of which may be associated with a separate conveyor line. Each print head control is provided with an address through the dip switches 146 and address latch 148. Thus, each print head control may be assigned a separate and distinct address for identification by the main controller, and one print head control board can have its address changed to fit in any of the address positions as might be used with a single main controller. A list of type numbers for various components is included in Appendix A attached hereto.

OPERATION

Figure 5:
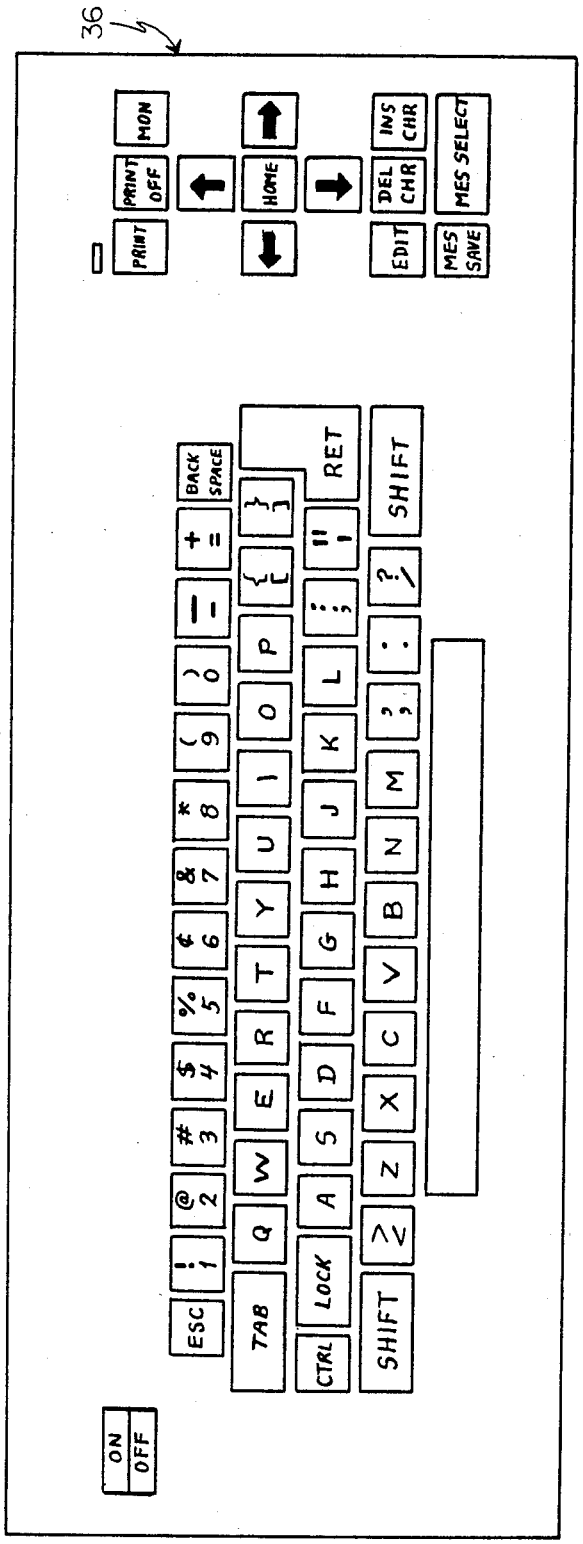
FIG. 5 illustrates the keyboard used with the main controller.
Figure 6A:
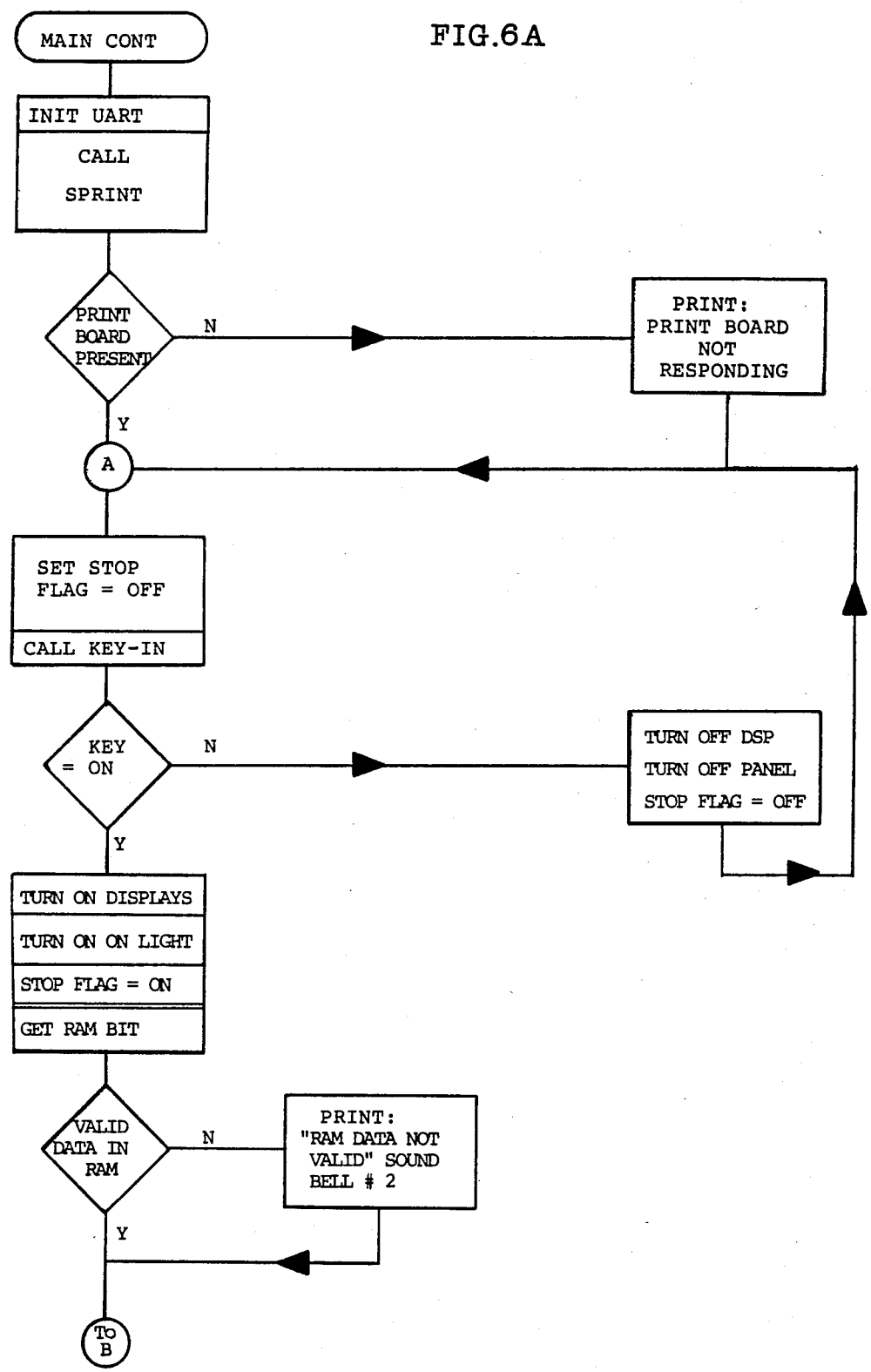
FIGS. 6A and 6B are overall flow charts of program for the main controller.
Figure 6B:
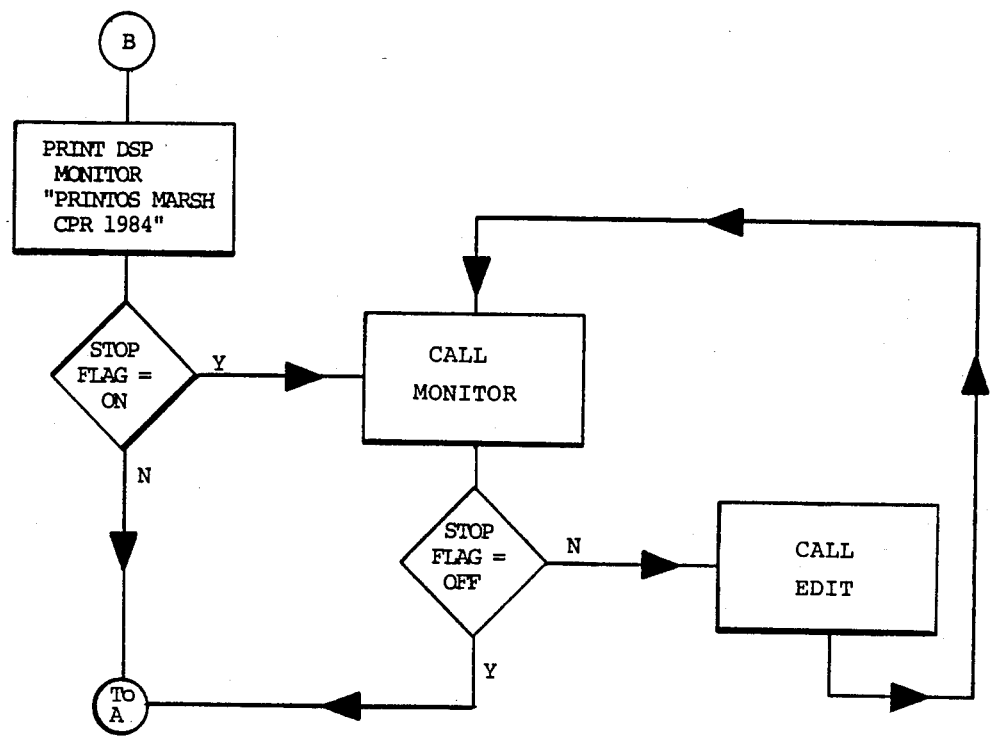

The general operation of the System 10 will now be described with references to the flow charts of FIGS. 6–10 of FIG. 5. Referring first to FIG. 6, when first turned on, the main controller first checks to make sure that a print board controller is in place and then initializes the system by turning on the displays, turning on the "on" light on the keyboard, checking the data stored in RAM memory, printing an appropriate copyright message on the display, and then exiting to the monitor routine of FIG. 7. In this monitor routine, the microprocessor of the main controller scans the various keys of the keyboard to interpret either a typed message, or a designated key. For example, if the "off" key is depressed, then the exit flag is set to zero, the stop flag is set to zero, and the program will then recognize that the exit flag is zero, return to the main controller program of FIG. 6 and disable the keyboard. The typewriter keys of the keyboard have specific codes which are generated and recognized by the software, and displayed on the appropriate display. These keys can be used to type in specified messages which are decoded, as noted in the flow chart of FIG. 7, to call up specified subroutines to do specific tasks.

One such subroutine is "multi" and permits an operator to select and prepare messages seriatim for more than one print head. Alternately, the MES SELECT key may be depressed to select and print a single message for a single print head, such as when it is desired to print or change only one message, or when only one print head is being used. The messages to be printed may be selected by either keying-in characters to form the message, or by depressing the MES SELECT key followed by other designated keys to call up messages previously selected and stored in memory. Such stored messages typically are those frequently used. The main controller has three display lines, one for monitoring a message which may be printed by a print head, one for editing messages, and one for displaying error messages. To change or edit a message, the edit key is depressed. The monitor program recognizes the edit key, calls for a valid password, and if given by the operator, sets the exit flag to zero which moves the program control through the stop flag test of FIG. 6 and into the edit program of FIG. 8. The message is then displayed on the edit display. In this program, there are a variety of edit functions available to the operator of the system. As is typical of work processing systems, a cursor is displayed and means are provided for moving the cursor in various ways and to different locations to perform the editing function. The flow chart of FIG. 8 for the edit mode, in conjunction with the keyboard of FIG. 5, shows clearly the various edit functions that result by depressing the various keys labeled RET, BACK SPACE, HOME, CURSOR LEFT, CURSOR RIGHT, CURSOR UP, CURSOR DOWN, TAB, DEL CHR and INS CHR.

If the operator wishes to save a message, he depresses the MES SAVE key. As shown by the flow chart of FIG. 8, depressing the MES SAVE key will call a subroutine to display a series of instructions. The first calls for the operator to select the dot size for the message. With this embodiment, any one of ten dot sizes may be selected by depressing one of the keys numbered 0 through 9. The selected dot size is stored. After selecting the dot size, there is an instruction to select the character width. There are also ten such widths to choose from by depressing a number key 0 through 9. Next there is an instruction to select product delay which relates to the spacing of the message from the leading edge of the object. With this embodiment any of one hundred delays may be selected by entering a number, 0–99. Next an instruction is displayed to select whether reverse printing is desired. If yes, the Y key is depressed; if no, the N key is depressed. Next an instruction is displayed as to whether inverted printing is desired. This is also a yes/no function. Finally, a message is displayed as to whether double dot printing is desired, also a yes/no function. At the completion of the last instruction, the data representing these various functions are stored in memory.

Having selected a message to be printed, and having designated the various parameters such as dot size, character width, etc., the operator has now programmed the message and these parameters into the main controller. To print the message in accordance with the selected parameters, the operator depresses the PRINT key which calls a CALL PRINT subroutine for transmitting the message and parameters to a selected one of the print head controllers 14. If the operator had been in the "multi" mode, i.e. with more than one print head being controlled by the main controller, then the display will ask the operator to select the appropriate print head to which it is desired this message to be sent. The operator then may select the appropriate print head and enter the data which will then call up the CALL PRINT subroutine for transmitting the message and parameters to the selected one of the print head controllers. The program control will then return to the MES SELECT display and the operator may once again select a stored message for display and/or editing. This program will continue to loop until the last print head controller which is present has been designated to receive a message, at which time the operator may terminate the program by depressing the "off" button on the keyboard, or he may continue to select and edit messages, as desired.

As will be noted from the diagram of FIG. 1, and further from the electrical schematic of the main controller printed circuit board shown in FIG. 2, the data from the main controller 12 is "daisy chained" to all of the print head controllers 14. In other words, the data from the main controller is transmitted by a data bus 38 to one print head controller, and from there the same data is further transmitted via another data bus 40 to a second print head controller, and from there to another print head controller, and so on. While the described embodiment will handle up to eight print head controllers, additional controllers can be added with suitable circuit and software modifications.

Figure 9:
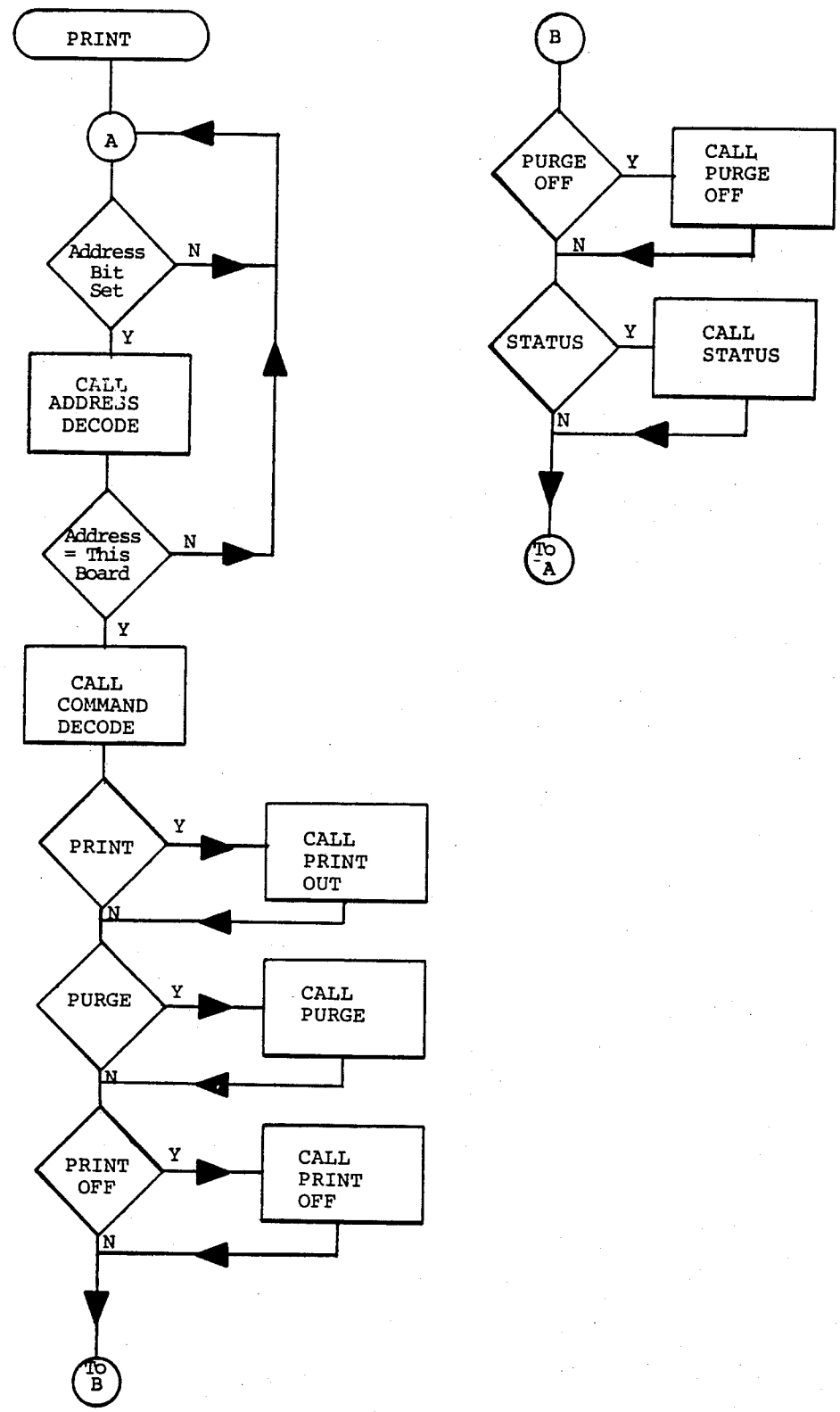
FIG. 9 is an overall flow chart of the program for the print head controller.

As shown by the flow chart of FIG. 9, which is a general flow chart of each print head controller, the data sent to all the print head controllers includes data representing an address code for each controller. Thus, each controller decodes the code data and processes only the data for the messages to be printed by the print head it controls. As shown by the flow chart of FIG. 9, the print head controller decodes the data and if it calls for a message to be printed, it calls the print out subroutine of FIGS. 10A through 10F and the message is printed by the appropriate print head.

Figure 10A:
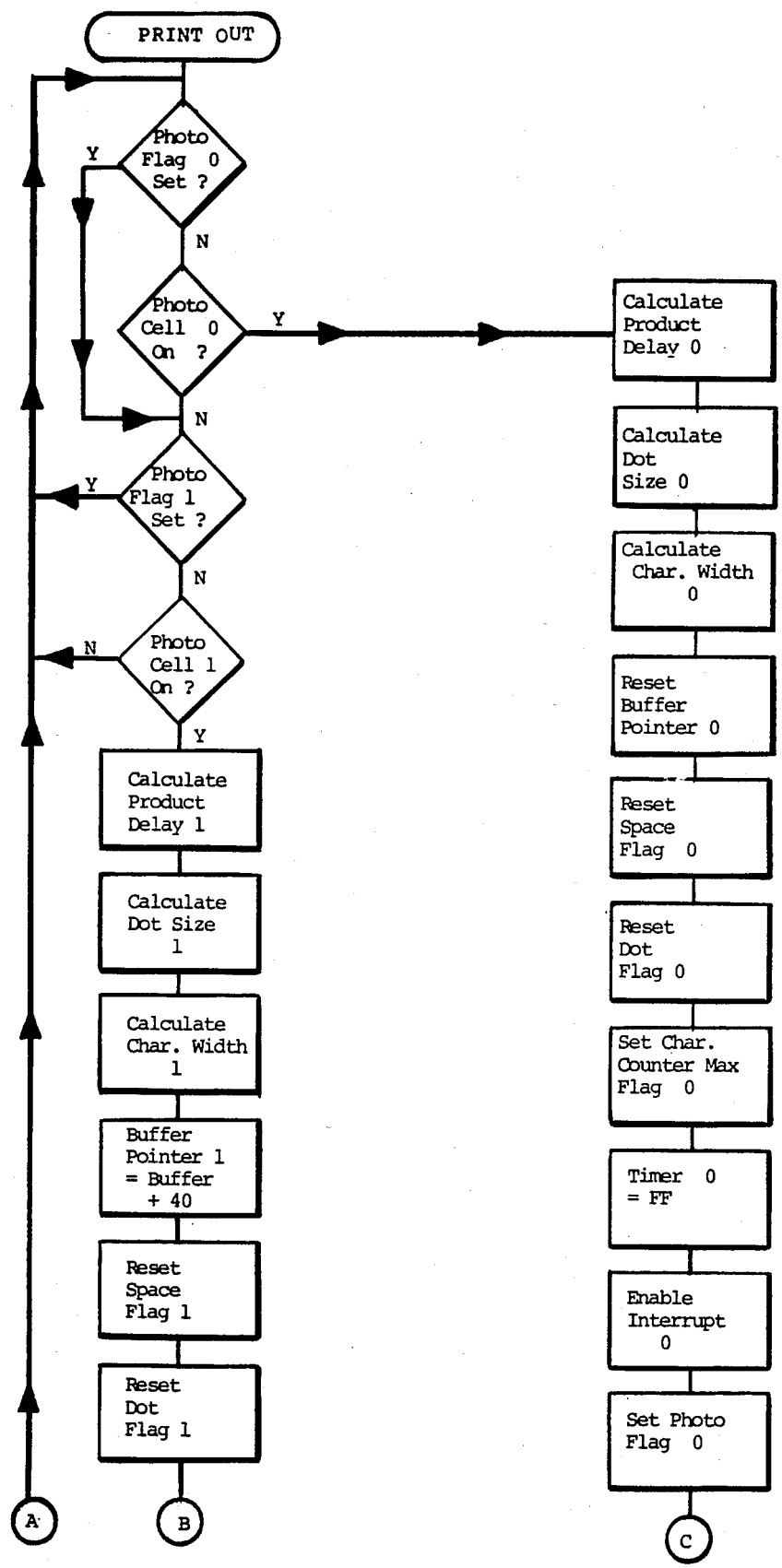
FIGS. 10A through 10F are flow charts of the print out and print off routines of each print head controller.
Figure 10B:
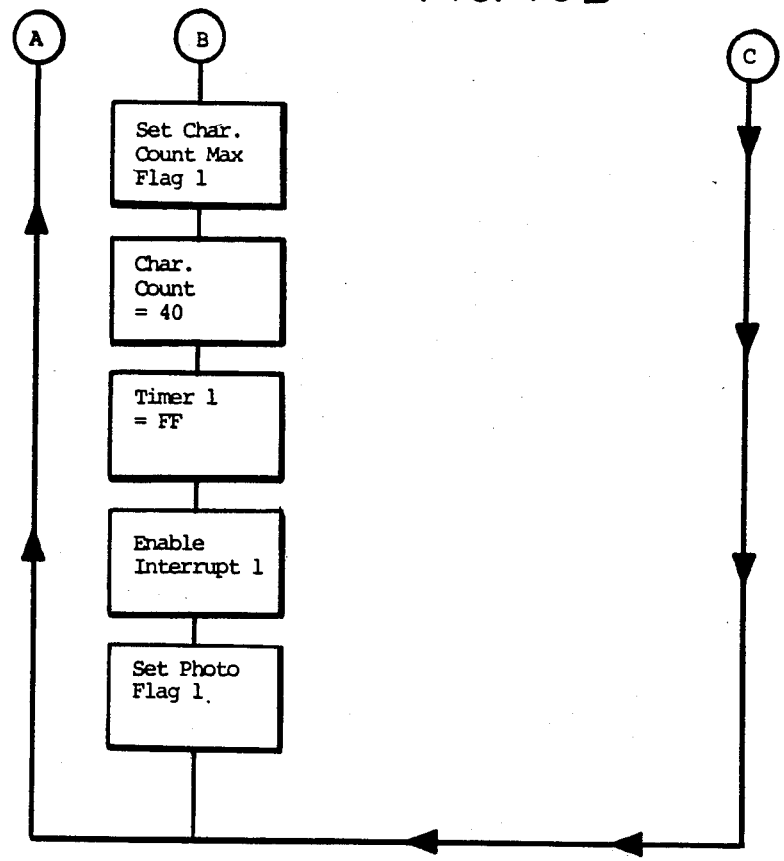
Figure 10B:
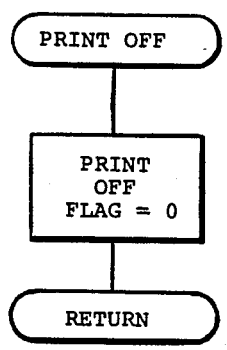
Figure 10C:
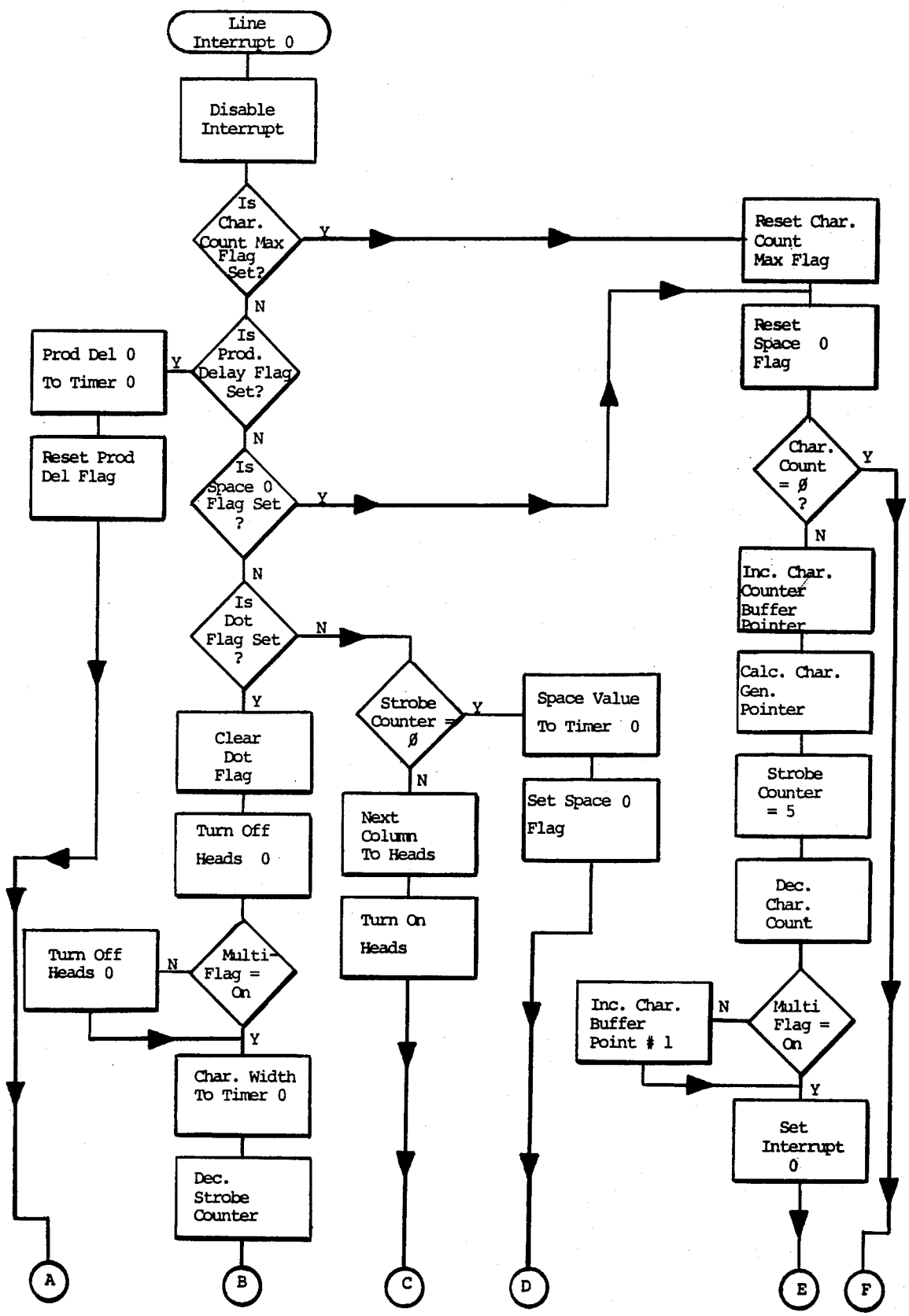
Figure 10D:
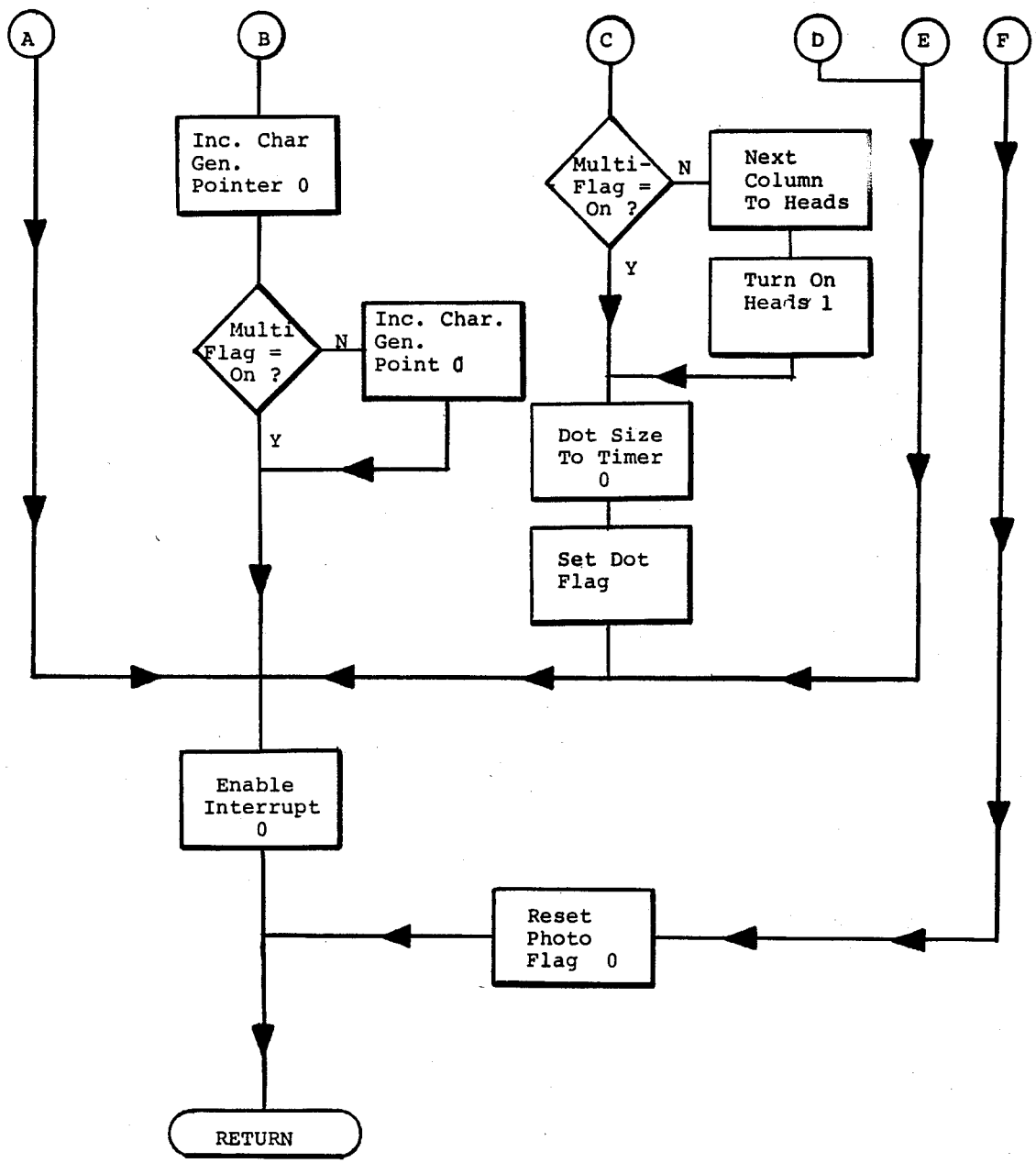
Figure 10E:
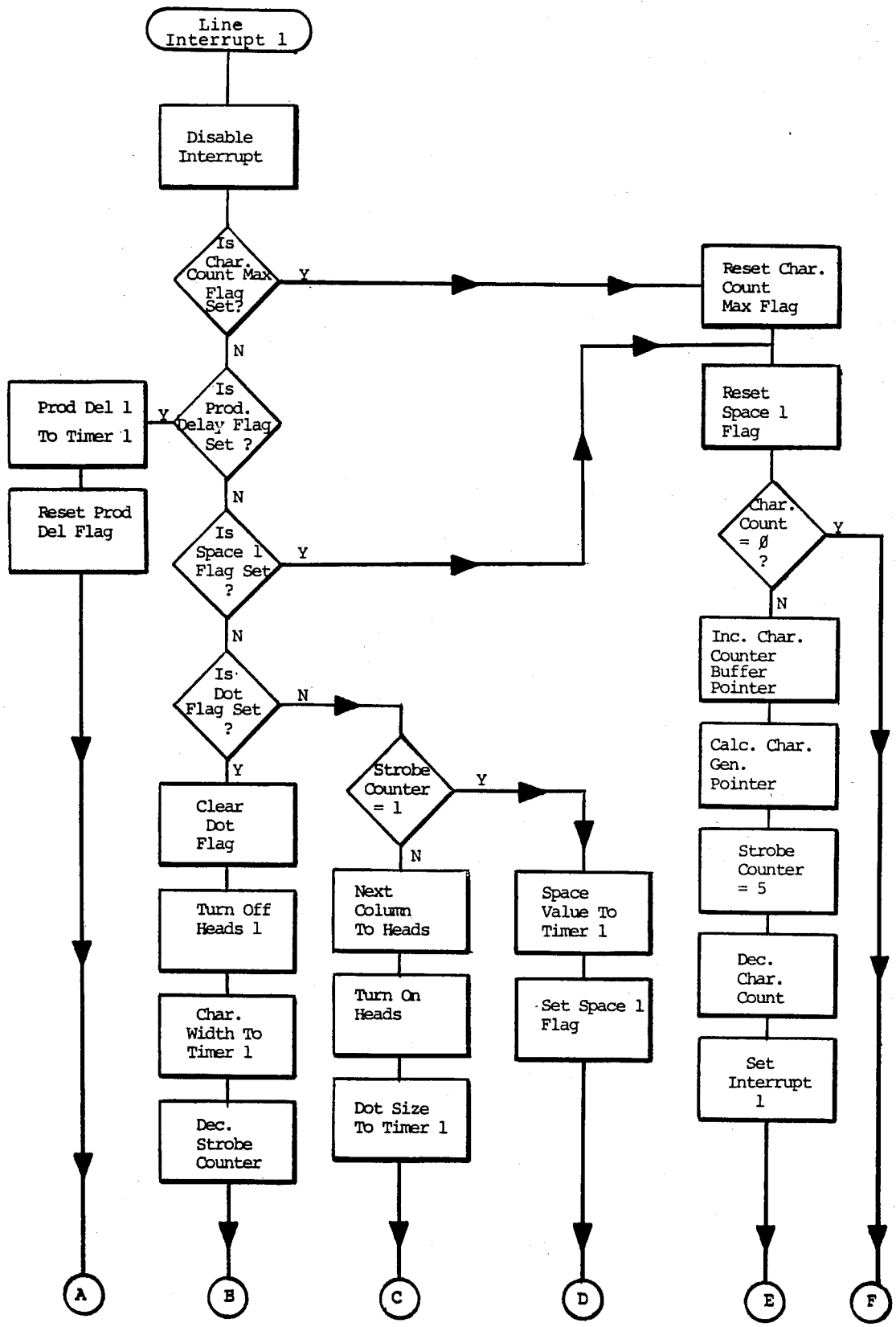
Figure 10F:
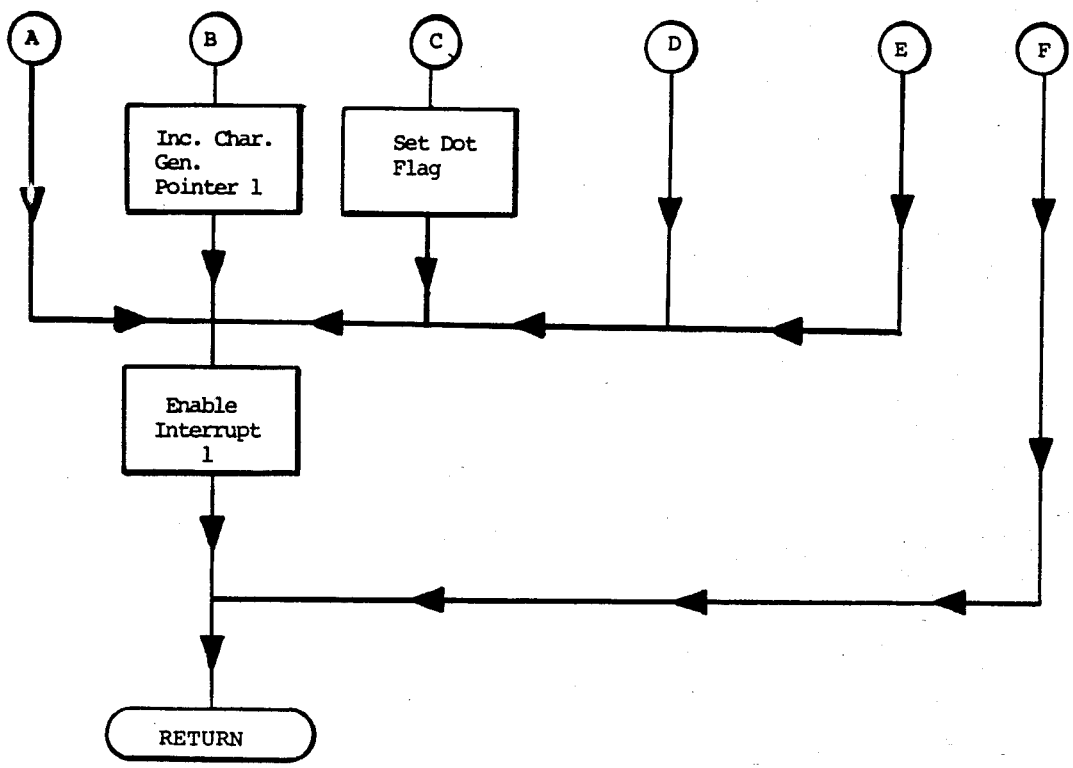

As shown in FIGS. 10A through 10F, the print out routine has three parts. In FIGS. 10A and 10B, the software first checks to determine whether a photo flag has been set, and if not, then whether the photocell is on indicating presence of a product to be printed. If a product is present then the product delay is calculated, the dot size is calculated, the character width is calculated, the buffer pointer is reset to read the message to be printed, flags are reset and set, and the appropriate timer is set at its maximum value to generate an interrupt signal, the interrupt is enabled, and the photo flag is set to prevent that portion of the program of FIGS. 10A and 10B from being re-executed until the product stream has been printed to completion. When an interrupt is generated, the line interrupt subroutines of FIGS. 10C and D and 10E and F are executed as called for. Taking the line interrupt zero program of FIGS. 10C and 10D, as an interrupt is generated by the timer zero, this routine is executed. First, the interrupt is disabled to permit complete execution of the program, and then, if this is the first execution of the program, the character count max flag is set which ensures that the right column of the program is executed to set up the parameters and to locate the pointers as necessary to print the entire message. The next time through the program, the product delay flag ensures that the product delay, if any, is set to the timer zero. The next time through the routine, if the space zero flag is not set meaning that there is space required at this moment in time between characters, then the dot flag set test and the strobe counter test cycles the print nozzles through five print operations (until the strobe counter decrements from five to zero) to produce a single character of the message. When the strobe counter equals zero, the space value is loaded into timer zero, the space zero flag is set, and the timer zero times down until it is time to begin printing the next character. The multi-flag tests in this program provide the necessary logic to permit setting up and execution of the line interrupt one program of FIGS. 10E and 10F at this print head controller. This means that more than one message is being sent to this print head controller for processing and printing onto product either in the same or in a different production conveyor line. As can be determined by comparing the program of FIGS. 10C and 10D with FIGS. 10E and 10F, they are very similar except that FIGS. 10C and 10D contain the multiflag test blocks to permit operation of the line interrupt one program. If the operator had not selected multi-head operation in the monitor program as explained in connection with FIG. 7, then the line interrupt one program would not be utilized.

Figure 7A:
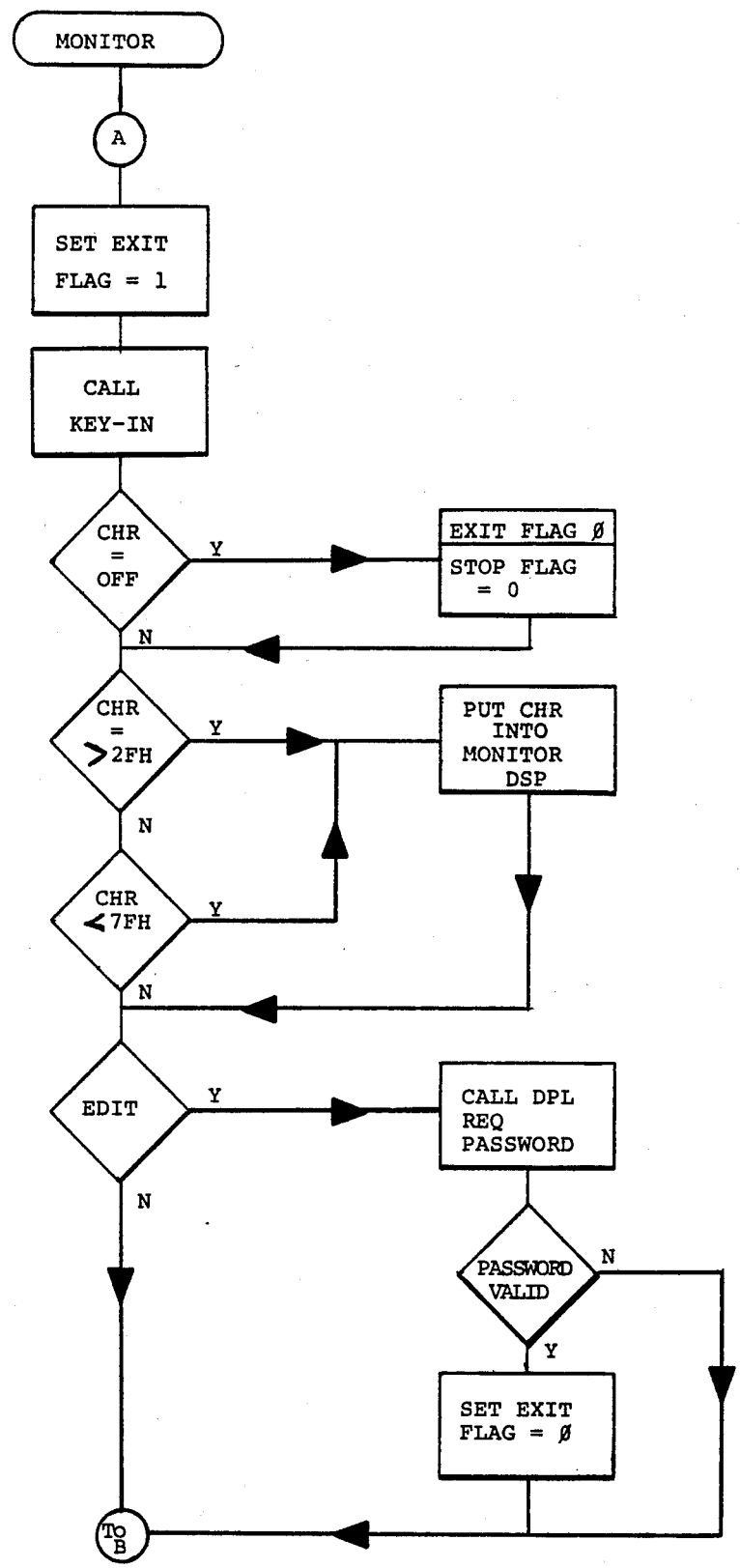
FIGS. 7A, 7B, and 7C are flow charts of the monitor mode routine of the main controller program.
Figure 7B:
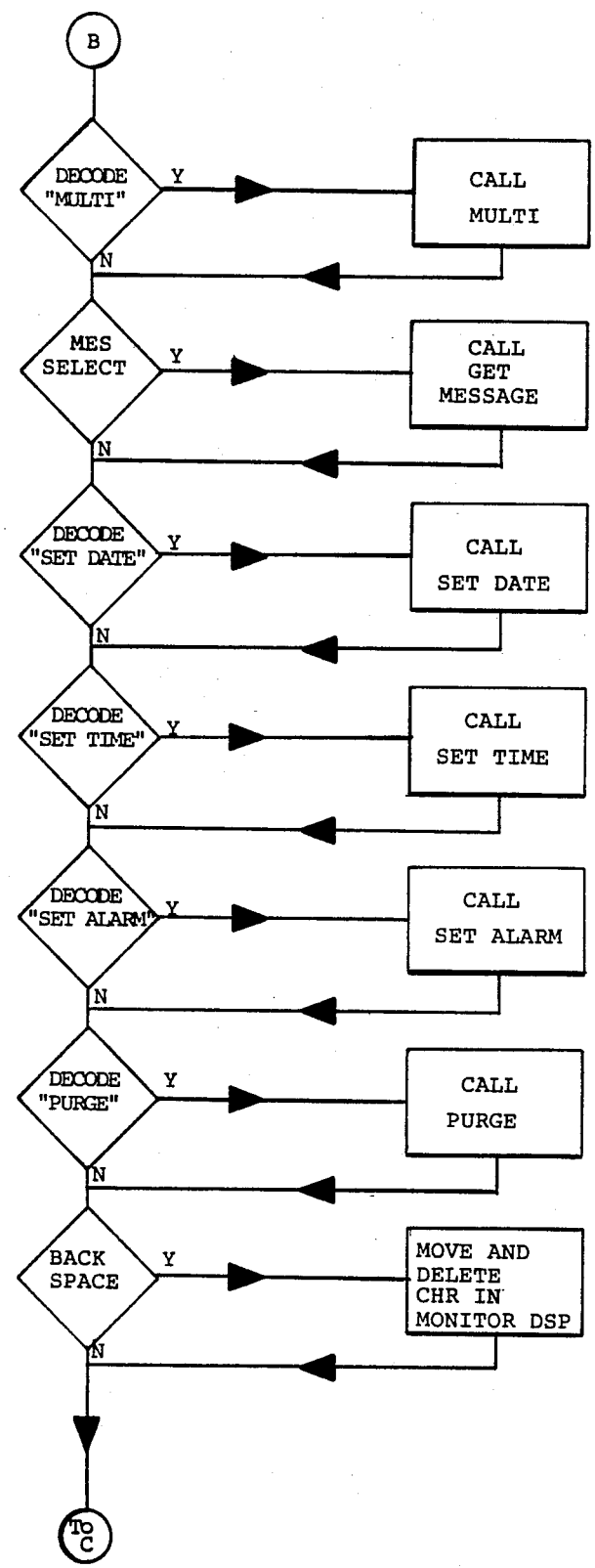
Figure 7C:
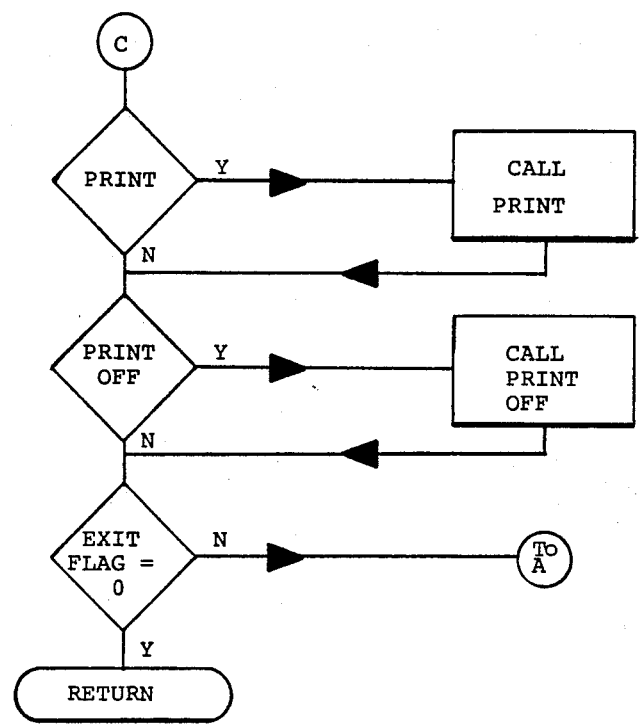
Figure 8A:
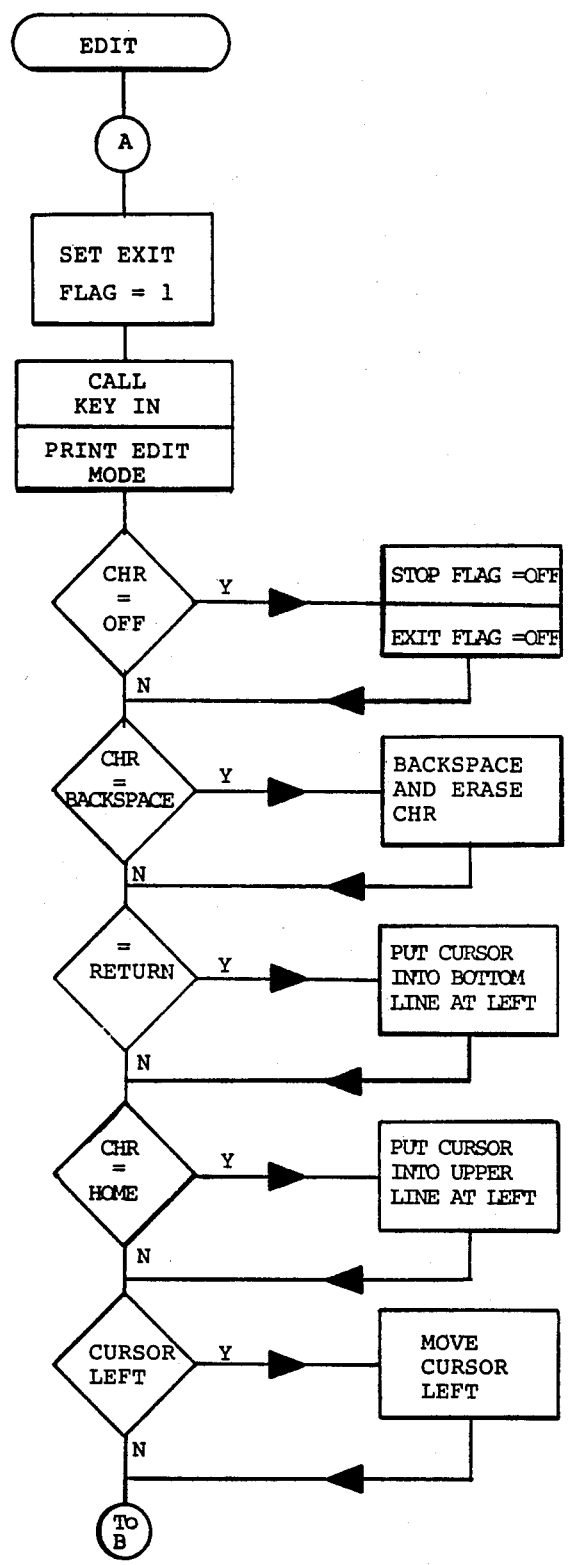
FIGS. 8A, 8B, and 8C are flow charts of the edit mode routine of the main controller.
Figure 8B:
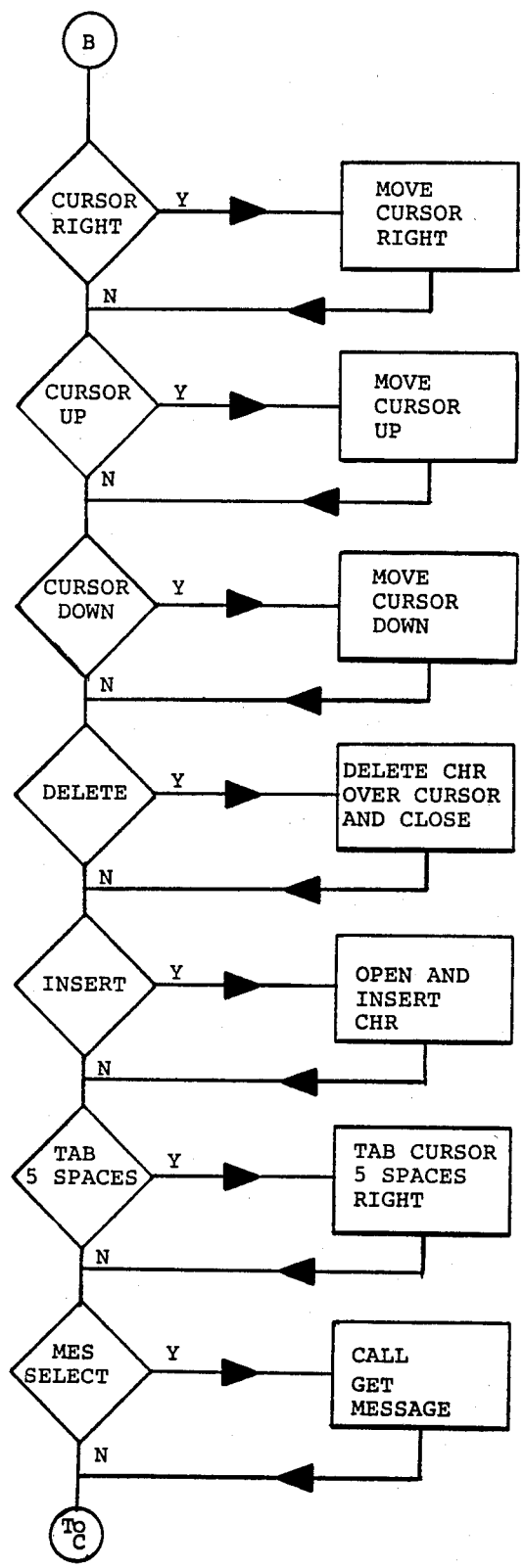
Figure 8C:
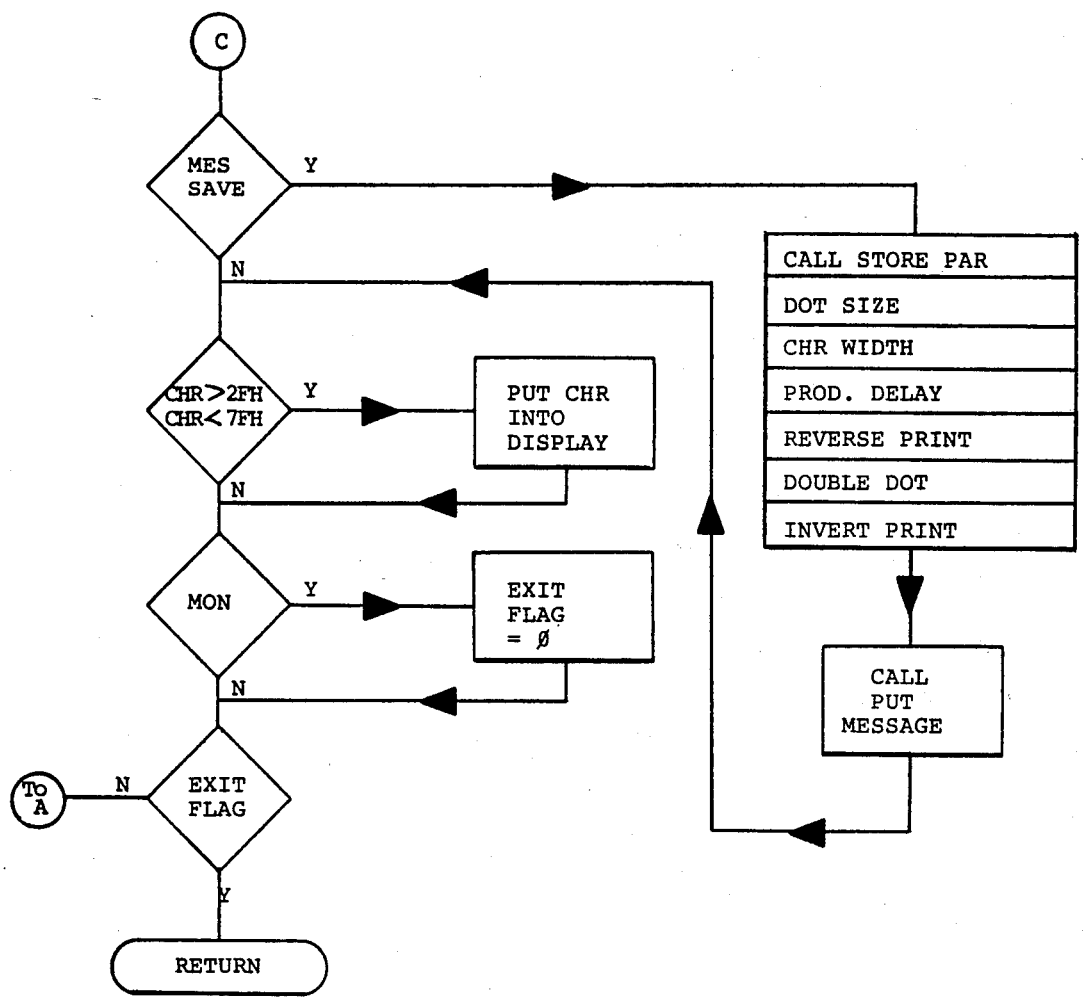
Figure 11:
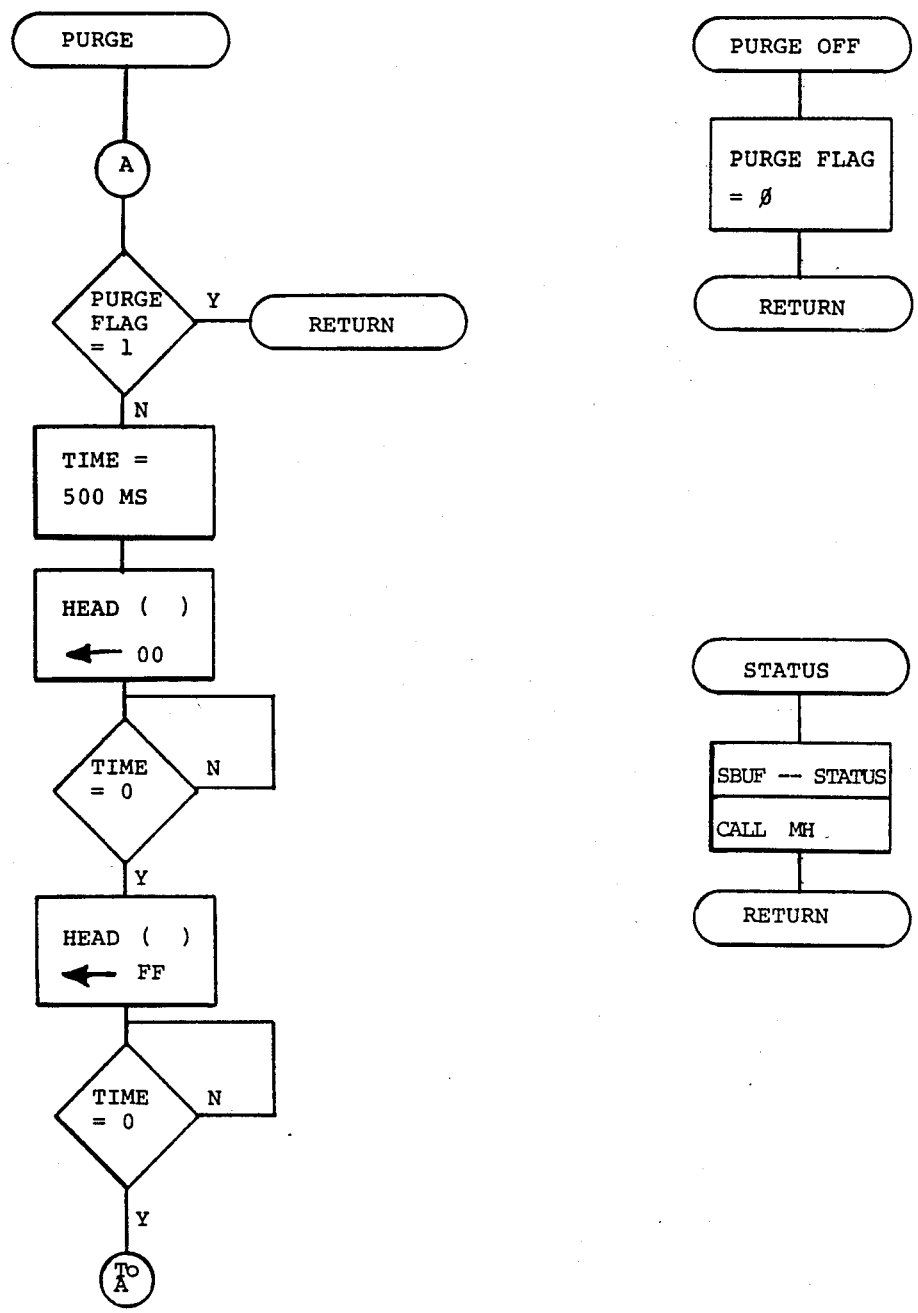
FIG. 11 is a flow chart of the purge, purge off, and status mode routines of each print head controller.

It will be noted that in addition to printing selected messages, as shown by the flow charts of FIGS. 7, 9 and 11, there are additional functions that may be controlled or parameters that may be monitored. For example, the time and date are displayed at the main processor and may be set as indicated. Appropriate alarms, such as lights or bells, may be used to indicate malfunctions. Also, the ink lines may be purged by command from the main processor. It will also be noted from the flow charts of FIGS. 6, 7 and 8 that a message may be sent to print only from the monitor mode and not from the edit mode. This ensures that the operator has finished his editing and consciously returns to Monitor before the message can be printed. Once a message is sent to print, an operator can edit and/or store additional messages at the main controller as previously edited messages are being printed by the various printers. Moreover, once a particular print head controller receives data for it to process, it thereafter processes that data independently of the main controller.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

| APPENDIX A |
| --- |
| PRINT HEAD CONTROLLER COMPONENTS |
| U3 - LM 393 |
| U9 - 7406 |
| U13 - 74LS02 |
| U18 - 74LS04 |
| U6 - 74LS373 |
| U17 - 74LS373 |
| U10 - 7406 |
| U14 - 2732A |
| U15 - 74LS373 |
| U5 - 8032 |
| U19 - 74LS04 |
| U2 - 26LS32 |
| U8 - 26LS31 |
| U11 - 7406 |
| U16 - 8253 |
| U7 - 74LS373 |
| U12 - NE555 |
| U4 - 74LS00 |
| U20 - LM393 |

| MAIN CONTROLLER COMPONENTS | |
| --- | --- |
| U13 - 74LS04 | U19 - 555 |
| U16 - 74LS00 | U22 - 79L05 |
| U3 - 74LS08 | U12 - 2816AP |
| U2 - 26LS31 | U11 - 2816AP |
| U1 - 26LS32 | U10 - 2816AP |
| U14 - 74LS154 | U9 - 2816AP |
| U8 - 2764A | U17 - 74LS04 |
| U7 - 74LS373 | U18 - 74LS11 |
| U20 - 74LS373 | U23 - 74LS02 |
| U15 - 146818 | |
| U6 - 8031 | |
| U21 - 74LS154 | |
| U5 - 1488 | |
| U25 - 74LS123 | |
| U4 - 1489 | |

What is claimed is:

1. A computer controlled ink jet printing system for printing messages on objects such as cartons or the like as they move along conveyor lines past printing stations, there being a plurality of print stations, said print stations being spaced one from the other, and one or more conveyor lines, said system comprising a plurality of print heads, at least one per print station, each print head having ink control means for discharging ink onto the objects as they move therepast in accordance with a programmed message, at least one print head control, each such print head control having means to control print heads of a plurality of stations, each print head control having means for controlling each print head it controls independently of others it controls, whereby said print head control controls the messages, including the parameters of product delay, dot size, and character width, printed by one print head at one station independently of the messages, including said parameters, printed by another print head at another station, and a main controller linked to said print head control, said main controller further comprising a programmable microprocessor, means for selecting messages for printing by each print head, and means for communicating said selected messages to said print head control, whereby said print head control independently controls print heads at each of a plurality of print stations to print onto the objects the messages selected at the main controller.

2. The system of claim 1 wherein said print head control further comprises a microprocessor programmed by said main controller to control said print heads to print the messages selected at the main controller, said print head control having means to independently control said print heads once programmed by the main controller.

3. The system of claim 2 wherein each print station is characterized as having a sensing means for sensing the presence of an object to be printed, said print head control having means for inputting a plurality of said sensing means and for controlling the printing of programmed messages at a particular station only upon the sensor means at that station sensing object presence.

4. The system of claim 3 wherein some of said stations are at different conveyor lines, and speed sensing means at each line for sensing the linear speed of the line, said print head control having means for inputting a plurality of said speed sensing means and for controlling each print head at a station in response to the speed sensing means only at that station.

5. The system of claim 2 wherein said main controller has means to program a selected printing direction, forward or reverse, for each print head.

6. The system of claim 2 wherein said main controller has means to program a selected printing orientation, upright or inverted, for each print head.

7. The system of claim 1 wherein said main controller has display means for displaying the messages selected for printing by each print head.

8. The system of claim 7 wherein said main controller has means for editing the selected messages.

9. The system of claim 1 wherein said main controller has memory means for storing preselected messages, and means for addressing said storage means for printing selected memory messages.

10. The system of claim 1 further comprising means for counting said objects printed at each station, said main controller having means for displaying said counts.

11. The system of claim 1 wherein said main controller has keys for entering messages, a first display line for displaying said keyed-in messages for monitoring, and a second display line for displaying messages for editing and printing by the print heads.

12. The system of claim 11 wherein said main controller further includes a third display line for displaying error information.

13. A computer controlled ink jet printing system for printing messages on objects such as cartons or the like as they move along conveyor lines past printing stations, there being a plurality of print stations and one or more conveyor lines, said system comprising a plurality of print heads, at least one per print station, having ink control means for discharging ink onto the objects as they move therepast in accordance with a programmed message, a plurality of print head controls, each such control having means to control print heads of a plurality of stations, each print head control having means for controlling each print head it controls independently of others it controls, whereby said print head control controls the messages, including the parameters of product delay, dot size, and character width, printed by one print head at one station independently of the messages, including said parameters, printed by another print head at another station, and a main controller linked to each of the plurality of print head controls, said main controller further comprising a programmable microprocessor, means for selecting messages for printing by each print head, and means for communicating said selected messages to the print head controls, whereby each of the plurality of print head controls independently controls print heads at each of a plurality of print stations to print the messages selected at the main controller.

14. The system of claim 13 wherein the data from the main controller representing the messages to be printed by each print head is communicated to all print head controls, each such control having decoding means to select the data representing the messages to be printed by the print heads it controls.

15. The system of claim 14 wherein each of the plurality of print head controls further comprises a microprocessor programmed by said main controller, each said print head control controlling the print heads associated therewith independently of the main controller once programmed by the main controller.

16. The system of claim 15 wherein each print station is characterized as having a sensing means for sensing the presence of an object to be printed, said print head control having means for inputting a plurality of said sensing means and for controlling the printing of programmed messages at a particular station only upon the sensor means at that station sensing object presence.

17. The system of claim 16 wherein some of said stations are at different conveyor lines, and speed sensing means at each line for sensing the linear speed of the line, said print head controls having means for inputting a plurality of said speed sensing means and for controlling each print head at a station in response to the speed sensing means only at that station.

18. The system of claim 15 wherein said main controller has means to program a selected printing direction, forward or reverse, for each print head.

19. The system of claim 18 wherein said main controller has means to program a selected printing orientation, upright or inverted, for each print head.

20. The system of claim 15 wherein said main controller has display means for displaying the messages selected for printing by each print head.

21. The system of claim 20 wherein said main controller has means for editing the selected messages.

22. The system of claim 15 wherein said main controller has memory means for storing preselected messages, and means for addressing said storage means for printing selected store messages.

23. The system of claim 22 wherein said main controller has keys for selecting messages, a first display line for displaying keyed-in messages, and a second display line for displaying messages for editing and printing by the print heads.

24. The system of claim 23 wherein said main controller has a third diaplay line for displaying error information.

25. A computer controlled ink jet printing system for printing messages on objects such as cartons or the like as they move along conveyor lines past printing stations, there being a plurality of print stations and one or more conveyor lines, each character of each message being printed in a dot matrix format, said system comprising a plurality of print heads, at least one per print station, each print head having nozzles through which ink is discharged onto the object to be printed, the ink discharged from each nozzle forming a dot on the object, and each print head having control means for controlling the delivery of ink to each nozzle in accordance with electrical signals received by said control means, at least one print head control having means to generate said electrical signals for controlling the print heads of a plurality of stations, each print head control having means for controlling each print head it controls independently of others it controls, whereby said print head control controls the messages, including the parameters of product delay, dot size, and character width, printed by one print head at one station independently of the messages, including said parameters, printed by another print head at another station, and a main controller linked to said print head control, said main controller further comprising a programmable microprocessor, means for selecting messages for printing by each print head, and means for communicating said selected messages to said print head control, whereby said print head control independently controls print heads at each of a plurality of print stations to print in dot matrix format onto the objects the messages selected at the main controller.

26. The system of claim 25 further comprising a plurality of said print head controls, said main controller linked to each print head control and having means for selecting the messages for printing by each print head.

27. The system of claim 26 wherein each print head control further comprises a microprocessor programmed by said main controller to control the print heads associated therewith to print the messages selected at said main controller, said print head control having means to control said print heads independently of the main controller once programmed by the main controller.

28. The system of claim 27 wherein the data from the main controller representing the messages to be printed by each print head is communicated to all print head controls, each such control having decoding means to select the data representing the messages to be printed by the print heads it controls.

29. The system of claim 27 wherein each print station is characterized as having a sensing means for sensing the presence of an object to be printed, said print head control having means for inputting a plurality of said sensing means and for controlling the printing of programmed messages at a particular station only upon the sensor means at that station sensing object presence.

30. The system of claim 29 wherein some of said stations are at different conveyor lines, and speed sensing means at each line for sensing the linear speed of the line, said print head control having means for inputting a plurality of said speed sensing means and for controlling each print head at a station in response to the speed sensing means only at that station.

31. A computer controlled ink jet printing system for printing messages on objects such as cartons or the like as they move along one or more conveyors, said system comprising a plurality of print heads, each having ink control means for discharging ink onto the objects as they move therepast in accordance with a programmed message, a print head control controlling a plurality of print heads, said print head control having means for controlling each print head it controls independently of others it controls whereby the print head control controls the messages, including the parameters of product delay, dot size, and character width, printed by one print head independently of the messages, including said parameters, printed by another print head.

32. The system of claim 31 further comprising a main controller linked to said print head control, said main controller further comprising a programmable microprocessor, means for selecting messages for printing by each print head, and means for communicating said selected messages to said print head control.

33. The system of claim 32 wherein said print head control further comprises a microprocessor programmed by said main controller to control said print heads to print the messages selected at the main controller, said print head control having means to independently control said print heads once programmed by the main controller.

34. The system of claim 31 further comprising multiple sensing means for sensing the presence of objects to be printed, said print head control having means for inputting a plurality of said sensing means and for controlling the printing of messages by at least one print head upon a select one of said sensing means sensing object presence, and for controlling the printing of messages by at least another print head upon a second one of said sensing means sensing object presence.

35. The system of claim 34 wherein some of said print heads are at different conveyor lines, and speed sensing means at each line for sensing the linear speed of the line, said print head control having means for inputting a plurality of said speed sensing means and for controlling each print head at a station in response to the speed sensing means only at that station.

36. The system of claim 31 wherein said print head control further comprises timing means for each print head it controls, said parameters for the messages printed by a print head being determined in response to said timing means for said print head.

* * * * *